(12) United States Patent
Tsutsumi et al.

(10) Patent No.: US 11,772,707 B2
(45) Date of Patent: Oct. 3, 2023

(54) METHOD OF MANUFACTURING VEHICLE REAR MODULE, VEHICLE BACK DOOR, VEHICLE REAR MODULE, AND VEHICLE MODULE

(71) Applicant: KOITO MANUFACTURING CO., LTD., Tokyo (JP)

(72) Inventors: Yasuaki Tsutsumi, Shizuoka (JP);
Daisuke Mochizuki, Shizuoka (JP);
Hideaki Yamamoto, Shizuoka (JP);
Takenao Yoshimura, Shizuoka (JP);
Yuki Takahashi, Shizuoka (JP);
Masaaki Nakabayashi, Shizuoka (JP);
Hiroaki Hara, Shizuoka (JP);
Masayuki Kobayashi, Shizuoka (JP);
Masaru Kaneko, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 393 days.

(21) Appl. No.: 16/982,193

(22) PCT Filed: Mar. 19, 2019

(86) PCT No.: PCT/JP2019/011454
§ 371 (c)(1),
(2) Date: Sep. 18, 2020

(87) PCT Pub. No.: WO2019/181944
PCT Pub. Date: Sep. 26, 2019

(65) Prior Publication Data
US 2021/0024139 A1    Jan. 28, 2021

(30) Foreign Application Priority Data

Mar. 20, 2018  (JP) ................................. 2018-053289
Mar. 20, 2018  (JP) ................................. 2018-053290

(Continued)

(51) Int. Cl.
*B62D 25/08* (2006.01)
*B62D 29/04* (2006.01)
(Continued)

(52) U.S. Cl.
CPC .......... *B62D 25/08* (2013.01); *B29C 45/1628* (2013.01); *B60J 1/18* (2013.01);
(Continued)

(58) Field of Classification Search
CPC .. B62D 25/08; B62D 29/041; B29C 45/1628; B29C 2045/1637; B29C 45/1635;
(Continued)

(56) References Cited

U.S. PATENT DOCUMENTS 8,585,130 B2 * 11/2013 Gonin .................... B62D 25/08
296/187.11
2003/0150848 A1   8/2003 Noguchi et al.
(Continued)

FOREIGN PATENT DOCUMENTS

JP    S61-175010 U    10/1986
JP    S62253289 A    11/1987
(Continued)

OTHER PUBLICATIONS

International Search Report issued in corresponding International Application No. PCT/JP2019/011454, dated Jun. 11, 2019 (4 pages).
(Continued)

*Primary Examiner* — Joseph D. Pape
*Assistant Examiner* — Dana D Ivey
(74) *Attorney, Agent, or Firm* — Osha Bergman Watanabe & Burton LLP

(57) ABSTRACT

A method for producing a vehicle rear module that includes: a clear member monolithically including a lamp section and a window section; and a colored member for shielding at least part of a vehicle interior from the exterior. The method (Continued)

for producing the vehicle rear module comprises: a step for injecting a transparent resin from a single resin injection hole into a first cavity to form the clear member; and a step for injecting a colored resin from a plurality of resin injection holes into a second cavity to form the colored member.

7 Claims, 24 Drawing Sheets

(30) Foreign Application Priority Data

| Mar. 20, 2018 | (JP) | 2018-053291 |
|---|---|---|
| Mar. 20, 2018 | (JP) | 2018-053292 |
| Mar. 20, 2018 | (JP) | 2018-053293 |
| Mar. 20, 2018 | (JP) | 2018-053294 |
| Mar. 20, 2018 | (JP) | 2018-053295 |

(51) Int. Cl.
*B60Q 1/44* (2006.01)
*B60Q 1/34* (2006.01)
*B60J 1/18* (2006.01)
*B60J 5/10* (2006.01)
*B29C 45/16* (2006.01)
*B29K 23/00* (2006.01)
*B29K 69/00* (2006.01)
*B29L 31/30* (2006.01)

(52) U.S. Cl.
CPC ............... *B60J 5/10* (2013.01); *B60Q 1/34* (2013.01); *B60Q 1/44* (2013.01); *B62D 29/041* (2013.01); *B29C 45/16* (2013.01); *B29K 2023/12* (2013.01); *B29K 2069/00* (2013.01); *B29K 2995/002* (2013.01); *B29K 2995/0026* (2013.01); *B29L 2031/3005* (2013.01)

(58) Field of Classification Search
CPC ..... B60J 1/18; B60J 5/10; B60J 5/107; B60Q 1/34; B60Q 1/44; B60Q 1/268; B60Q 1/302; B29K 2023/12; B29K 2069/00; B29K 2995/002; B29K 2995/0026; B29L 2031/3005; B29L 2031/30; B60S 1/58
USPC ...................................................... 296/193.08
See application file for complete search history.

(56) References Cited

U.S. PATENT DOCUMENTS

| 2011/0241376 A1 | 10/2011 | Igura |
| 2014/0254186 A1* | 9/2014 | Terai .................. F21S 43/27 |
| | | 362/487 |

FOREIGN PATENT DOCUMENTS

| JP | H11-245659 A | 9/1999 |
| JP | 2003-211956 A | 7/2003 |
| JP | 5427190 B2 | 2/2014 |
| JP | 2014040132 A | 3/2014 |
| JP | 2014175199 A | 9/2014 |
| JP | 2017165273 A | 9/2017 |

OTHER PUBLICATIONS

Written Opinion of the International Searching Authority issued in corresponding International Application No. PCT/JP2019/011454, dated Jun. 11, 2019 (10 pages).
Office Action in corresponding Japanese Application No. 2020-507836, dated Mar. 7, 2023 (7 pages).
Notice of Reasons for Refusal in corresponding Japanese Application No. 2020-507836, dated Jul. 25, 2023 (5 pages).

* cited by examiner

METHOD OF MANUFACTURING VEHICLE REAR MODULE, VEHICLE BACK DOOR, VEHICLE REAR MODULE, AND VEHICLE MODULE

TECHNICAL FIELD

The present invention relates to a method of manufacturing a vehicle rear module, a vehicle back door, a vehicle rear module, and a vehicle module.

BACKGROUND ART

Patent Document 1 discloses an upper portion of a resin outer panel that includes a curved rear spoiler portion (protruding portion) on an upper side monolithically and a stop lamp unit provided below the rear spoiler portion.

Patent Document 1 discloses a resin back door that includes a resin outer panel and an inner panel and opens and closes an opening in a rear portion of a vehicle.

Patent Document 1 discloses a rear module (outer panel) including a transparent resin panel formed by injection molding, a part of which forms a window portion.

Patent Document 2 discloses a rear window glass including a heater wire (defogger).

A vehicle is required to be lightweight at all times. Therefore, Patent Document 1 proposes the resin back door that opens and closes an opening in a rear portion of a vehicle.

CITATION LIST

Patent Document

Patent Document 1: Japanese Patent No. 5427190
Patent Document 2: JP-A-S62-253289

SUMMARY OF INVENTION

Technical Problem

Patent Document 1 proposes a vehicle back door formed by a resin component. The back door includes an inner panel and an outer panel. The outer panel has a complicated shape monolithically including a window portion, a spoiler portion, and a high mount stop lamp portion.

The outer panel having such a complicated shape is easily formed by multipoint gate injection molding in which a resin is flowed from a plurality of gates in consideration of fluid flowability, that is, expandability of molten resin.

However, the present inventors found that, when the outer panel is formed by such multipoint gate injection molding, commerciality of a window is deteriorated due to a flow line (weld) of resin in the window portion. It is difficult to reduce a processing difficulty level of forming the complicated shape while improving the commerciality of the window.

Therefore, an object of an embodiment of the present invention is to provide a method of manufacturing a vehicle rear module which is easy to form and has high commerciality.

The rear module (outer panel) of the back door of Patent Document 1 is formed by injection-molding a transparent resin to obtain a transparent panel and then painting a vehicle inner side and a vehicle outer side of the panel.

When the back door opens and closes, an impact force acts on the back door. For this reason, a certain degree of strength is required for a component constituting the back door. On one hand, the rear module of the back door has a great influence on design of the vehicle. On the other hand, the resin constituting the component is preferred to have a small thickness from a viewpoint of weight reduction and transparency. However, it is difficult to obtain sufficient strength when the thickness of the resin is reduced.

An object of an embodiment of the present invention is to provide a vehicle back door having high strength and good appearance design.

In Patent Document 1, the vehicle inner side and the vehicle outer side of the rear module are painted, and the outer side is applied with a coating to prevent damage.

A window portion on a rear side of a vehicle is required to have scratch resistance. Recent years have seen increasing vehicles having low transmittance of the window portion on the vehicle rear side from a viewpoint of privacy protection and the like.

An object of an embodiment of the present invention is to provide a vehicle rear module including a window portion having a novel structure.

Since a glass window portion has high thermal conductivity, the window portion is uniformly warmed even at the defogger of Patent Document 2, and cloudiness due to dew condensation easily disappear. However, the present inventors found that, when the defogger disclosed in Patent Document 2 is used for the resin window portion of Patent Document 1, the cloudiness tends to remain.

Therefore, an object of an embodiment of the present invention is to provide a vehicle rear module capable of uniformly and efficiently heating a resin window portion.

The present inventors have studied a vehicle module including a portion functioning as a window and a portion functioning as a lens portion.

When a lamp device is simply mounted on the rear module, the rear module becomes heavier by a weight of the lamp device. Further, a certain thickness is required for the rear module in order to ensure rigidity for supporting the lamp device, and the rear module becomes heavier.

Therefore, an object of an embodiment of the present invention is to provide a lightweight vehicle module including a lens portion.

The back door of Patent Document 1 includes an inner panel and a rear module (outer panel). Such as when the back door opens and closes, an impact force acts on the back door. For this reason, a certain degree of strength is required for the component constituting the back door.

Therefore, the present inventors have studied an injection compression molding method to manufacture a rear module having high strength and including a pair of left and right lamps particularly such as RCLs.

On the other hand, the rear module has a great influence on the design of the vehicle. A complicated shape is required for the rear module.

However, it is not easy to manufacture a rear module which is large enough to cover the opening in the rear portion of the vehicle and has a complicated shape by injection compression molding.

An object of an embodiment of the present invention is to provide a vehicle rear module which has high strength and can be manufactured with high yield, and a method of manufacturing the same.

Solution to Problem

In order to achieve the above objects, an embodiment of the present invention provides a method of manufacturing a vehicle rear module.

In the method of manufacturing a vehicle rear module to be attached to open and close an opening provided in a rear portion of a vehicle, the vehicle rear module includes:
a clear member monolithically including a lamp portion that transmits light of at least a stop lamp and a turn signal lamp and a window portion; and
a colored member configured to shield at least a part of inside of the vehicle from outside.

The method of manufacturing the vehicle rear module includes:
injecting a transparent resin from a single resin injection hole into a first cavity to form the clear member; and
injecting a coloring resin from a plurality of resin injection holes into a second cavity to form the colored member.

According to the manufacturing method, since the clear member is injection molded with the single resin injection hole, it is possible to make a resin flow line less likely to appear and commerciality can be improved. Further, since the colored member is injection molded with a plurality of resin injection holes, it is easy to make a flow.

In the method of manufacturing the vehicle rear module,
the coloring resin may be injected into the second cavity in which the clear member is disposed to form the colored member.

In the method of manufacturing the vehicle rear module,
the transparent resin may be injected into the first cavity in which the colored member is disposed to form the clear member.

In order to achieve the above objects, an embodiment of the present invention provides a vehicle back door.

The vehicle back door to be attached to open and close an opening provided in a rear portion of a vehicle includes:
a vehicle rear module including:
a clear member monolithically including a lamp portion that transmits light of at least a stop lamp and a turn signal lamp and a window portion; and
a colored member configured to shield at least a part of inside of the vehicle from outside; and
a back door inner provided inside the vehicle relative to the vehicle rear module.

The colored member of the vehicle rear module is provided inside the vehicle relative to the clear member.

According to the vehicle back door, it is possible to provide a vehicle rear door having high strength and good appearance design by mounting a vehicle rear module having good appearance design and high strength.

In the vehicle back door,
the clear member and the colored member in the vehicle rear module may be formed by two-color molding.

In the vehicle back door,
the colored member may include an assembling protrusion protruding toward the inside of the vehicle, and
the colored member may be attached to the back door inner via the assembling protrusion.

In order to achieve the above objects, an embodiment of the present invention provides a vehicle back door.

The vehicle back door to be attached to open and close an opening provided in a rear portion of a vehicle includes:
a vehicle rear module including:
a clear member monolithically including a lamp portion that transmits light of at least a stop lamp and a turn signal lamp and a window portion; and
a colored member configured to shield at least a part of inside of the vehicle from outside; and
a back door inner provided inside the vehicle relative to the vehicle rear module.

The colored member is bonded to the clear member so as to border an outer edge of the clear member when the window portion is seen in a plan view According to the vehicle back door having the above configuration, the colored member borders the outer edge of the clear member. With this feature, the strength of the vehicle rear module can be improved by combining the clear member and the colored member. Since the clear member can be made thin, light weight and sufficient transparency can be ensured.

In the vehicle back door,
the colored member may be continuous along the outer edge of the clear member.

In the vehicle back door,
the colored member may include a linear portion extending linearly and having a honeycomb structure.

In order to achieve the above objects, an embodiment of the present invention provides a vehicle rear module.

The vehicle rear module to be attached to open and close an opening provided in a rear portion of a vehicle monolithically includes:
a lamp portion that transmits light of at least a stop lamp and a turn signal lamp; and
a window portion.

A hard coat layer is provided on at least a surface of the window portion which faces outside of the vehicle.

The hard coat layer is made of an acrylic resin or an acrylic urethane resin, a coloring material, and silica nanoparticles.

According to the vehicular rear module including the specific hard coat layer, scratch resistance is imparted, transmittance is not significantly lowered, a desired transmittance can be set, and privacy of an occupant can be protected.

The vehicle rear module may further include:
a clear element monolithically including the lamp portion and the window portion; and a colored element configured to shield at least a part of inside of the vehicle from outside when viewed from rear of the vehicle.

The hard coat layer may be provided on a surface of the colored element which faces the outside of the vehicle.

According to this configuration, by providing the same hard coat layer for the window portion and the colored element, it is possible to implement a uniform appearance.

In the vehicle rear module,
the hard coat layer may be provided over a surface of the clear element which faces the outside the vehicle and the surface of the colored element which faces the outside of the vehicle.

According to this configuration, by providing the same hard coat layer over a boundary between the clear element and the colored element, a further uniform appearance can be implemented.

In the vehicle rear module,
the hard coat layer may be provided over the entire surface of the clear element which faces the outside of the vehicle and the entire surface of the colored element which faces the outside of the vehicle.

According to this configuration, by providing the same hard coat layer over the entire clear element and the entire colored element, a particularly uniform appearance can be implemented.

In order to achieve the above objects, an embodiment of the present invention provides a vehicle rear module.

The resin vehicle rear module includes a window portion.

The window portion is provided with a planar heater formed by a metal layer and an electrode configured to supply electric power to the planar heater.

The metal layer is made of a metal selected from Al, Ag, Cu, Au, Rh, Pt, and Cr, and has a thickness of 20 nm or more and 150 nm or less.

According to the vehicle rear module, it is possible to efficiently heat the window portion to remove dew condensation, and the occupant can visually recognize the outside of vehicle from inside the vehicle.

In the vehicle rear module, a hard coat layer may be formed on a surface of the window portion which faces outside of a vehicle.

The planar heater may be formed on a vehicle inner side of the window portion.

The planar heater is typically formed on the vehicle inner side, and may also be formed on a vehicle outer side.

In order to achieve the above objects, an embodiment of the present invention provides a vehicle module.

The resin vehicle module to be attached to open and close an opening of a vehicle includes:

a window portion; and a lens portion capable of transmitting light emitted from a light source portion attached to the vehicle in a state where the opening is closed.

In the vehicle module, the lens portion may include a pair of left and right lens portions so as to transmit light emitted from a pair of right and left light source portions attached to the vehicle.

In order to achieve the above objects, an embodiment of the present invention provides a vehicle rear module.

The vehicle rear module to be attached to open and close an opening provided in a rear portion of a vehicle includes:

a window portion spreading along a first imaginary plane; and a pair of left and right lamp portions configured to transmit light from lamp units.

At least a portion of each of left and right end portions of the vehicle rear module extends along a second imaginary plane intersecting the first imaginary plane.

A thickness of each of the end portions increases in a normal direction of the first imaginary plane as the end portion extends far away from the window portion.

The vehicle rear module has a high strength since the end portion of the vehicle rear module extends along the second imaginary plane intersecting the first imaginary plane. The thickness of the end portion increases in the normal direction of the first imaginary plane as the end portion extends far away from the window portion. Therefore, a resin easily flows through the portion at the time of manufacture and a molding failure can be suppressed.

The present invention also provides a method of manufacturing a vehicle rear module.

The vehicle rear module to be attached to open and close an opening provided in a rear portion of a vehicle includes:

a window portion spreading along a first imaginary plane; and a pair of left and right lamp portions configured to transmit light from lamp units.

At least a portion of each of left and right end portions of the vehicle rear module extends along a second imaginary plane intersecting the first imaginary plane.

The method of manufacturing a vehicle rear module includes:

an injection step of injecting a resin into a cavity having a shape corresponding to the vehicle rear module; and a pressing step of pressing the resin in the cavity and spreading the resin into the cavity.

In a direction orthogonal to a pressing direction in the pressing step, a dimension of an end portion corresponding portion of the cavity that corresponds to an end portion of the vehicle rear module increases as approaching a flow direction of the resin.

In the method of manufacturing the vehicular rear module of the present invention, in a direction orthogonal to a pressing direction in the pressing step, a dimension of an end portion corresponding portion of the mold that corresponds to an end portion of the vehicle rear module increases as approaching the flow direction. Therefore, the resin easily flows through the end portion corresponding portion at the time of manufacture and a molding failure can be prevented.

Advantageous Effects of Invention

According to an embodiment of the present invention, it is possible to provide a method of manufacturing a vehicle rear module which is easy to form and has high commerciality.

According to an embodiment of the present invention, it is possible to provide a vehicle back door having high strength and good appearance design.

According to an embodiment of the present invention, it is possible to provide a vehicle back door having high strength and high commerciality.

According to an embodiment of the present invention, it is possible to provide a vehicle rear module including a window portion having a novel structure.

According to an embodiment of the present invention, it is possible to provide a vehicle rear module capable of uniformly heating a resin window portion.

According to an embodiment of the present invention, it is possible to provide a lightweight vehicle module including a lens portion.

According to an embodiment of the present invention, it is possible to provide a vehicular rear module which has high strength and can be manufactured with high yield, and a method of manufacturing the same.

DESCRIPTION OF EMBODIMENTS

Figure 1:
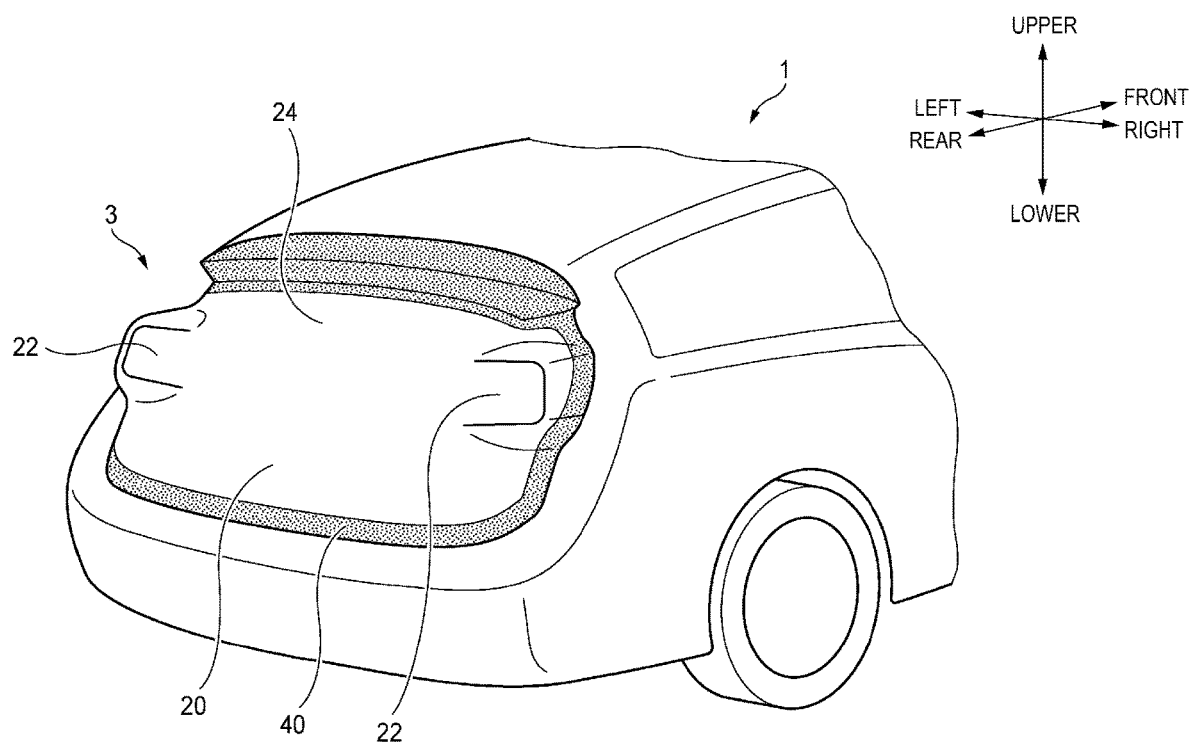
FIG. 1 is a perspective view showing a rear portion of a vehicle including a vehicle back door according to a first embodiment.

Hereinafter, embodiments of the present invention will be described in detail with reference to the drawings. Dimensions of members shown in the drawings may be different from actual dimensions thereof for convenience of description.

In the description of the embodiments, a "left-right direction", a "front-rear direction", and an "upper-lower direction" are appropriately referred to for convenience of description. These directions are relative directions set for a vehicle 1 shown in FIG. 1. Here, the "upper-lower direction" is a direction including an "upper side" and a "lower side". The "front-rear direction" is a direction including a "front side" and a "rear side". The "left-right direction" is a direction including a "left side" and a "right side".

First Embodiment (Vehicle Back Door and Vehicle Rear Module)

Figure 2:
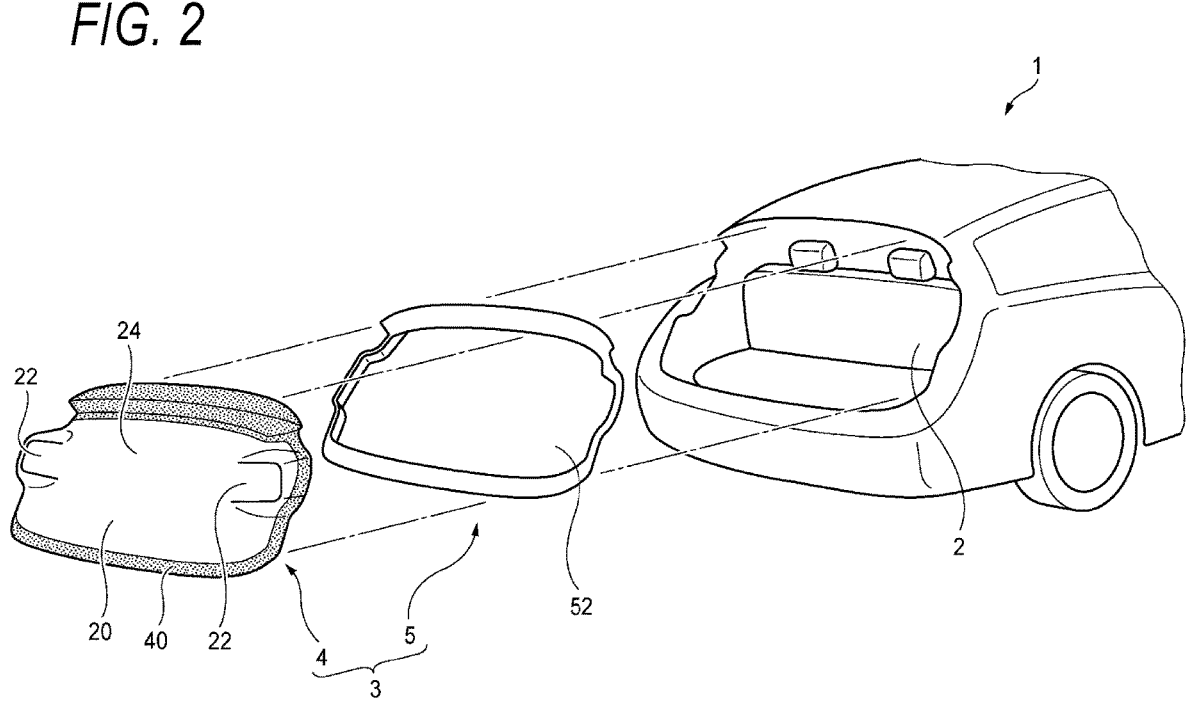
FIG. 2 is a schematic view showing a configuration of the vehicle back door according to the first embodiment.

First, a vehicle back door according to a first embodiment will be described with reference to FIGS. 1 and 2. FIG. 1 is a perspective view showing a rear portion of the hatchback vehicle 1 including a vehicle back door 3. FIG. 2 is a schematic view showing a configuration of the vehicle back door 3. The vehicle back door 3 is attached to a rear portion of the vehicle 1 so as to open and close an opening 2 provided in the rear portion of the vehicle 1. The vehicle back door 3 includes a vehicle rear module 4 and a back door inner 5 provided inside the vehicle 1 relative to the vehicle rear module 4.

The vehicle rear module 4 has a size capable of covering the opening 2 in the rear portion of the vehicle 1 (FIG. 2). The vehicle rear module 4 includes a clear member 20 and a colored member 40. The clear member 20 is a colorless or colored transparent member. The clear member 20 monolithically includes lamp portions 22 that transmit light and a window portion 24. The colored member 40 is a member having a lower light transmittance than the clear member 20 does. The colored member 40 is colored to visually shield at least a part of the inside of the vehicle 1 from the outside. The clear member 20 and the colored member 40 are made of a resin such as a polycarbonate (PC). The colored member 40 is made of a material in which a coloring material is kneaded with a resin material such as a PC serving as a matrix. The colored member 40 may contain an additive such as a filler.

The back door inner 5 is made of a material in which glass fiber or the like is kneaded with a resin such as polypropylene. The material forming the back door inner 5 is not limited to a specific resin and may be, for example, a metal. The back door inner 5 extends over an entire periphery of an outer peripheral portion of the vehicle rear module 4, and has an opening 52 corresponding to the lamp portions 22 and the window portion 24 (FIG. 2).

The back door inner 5 is bonded to the vehicle rear module 4 via an adhesive so that the vehicle back door 3 is formed. The vehicle back door 3 is attached to the rear portion of the vehicle via a hinge (not shown) provided on the back door inner 5.

A pair of left and right rear combination lamps (not shown) are provided at positions in front of the lamp portions 22 of the clear member 20 of the vehicle rear module 4. The lamp portions 22 in the present embodiment transmit light of a stop lamp and a turn signal lamp of the rear combination lamps. The rear combination lamps may be directly mounted on the vehicle rear module 4, may be mounted on the back door inner 5, or may be mounted by being supported by both the vehicle rear module 4 and the back door inner 5. Further, the rear combination lamps may be provided on a vehicle body so as to be covered by the lamp portions 22 of the clear member 20 of the vehicle rear module 4.

Figure 3:
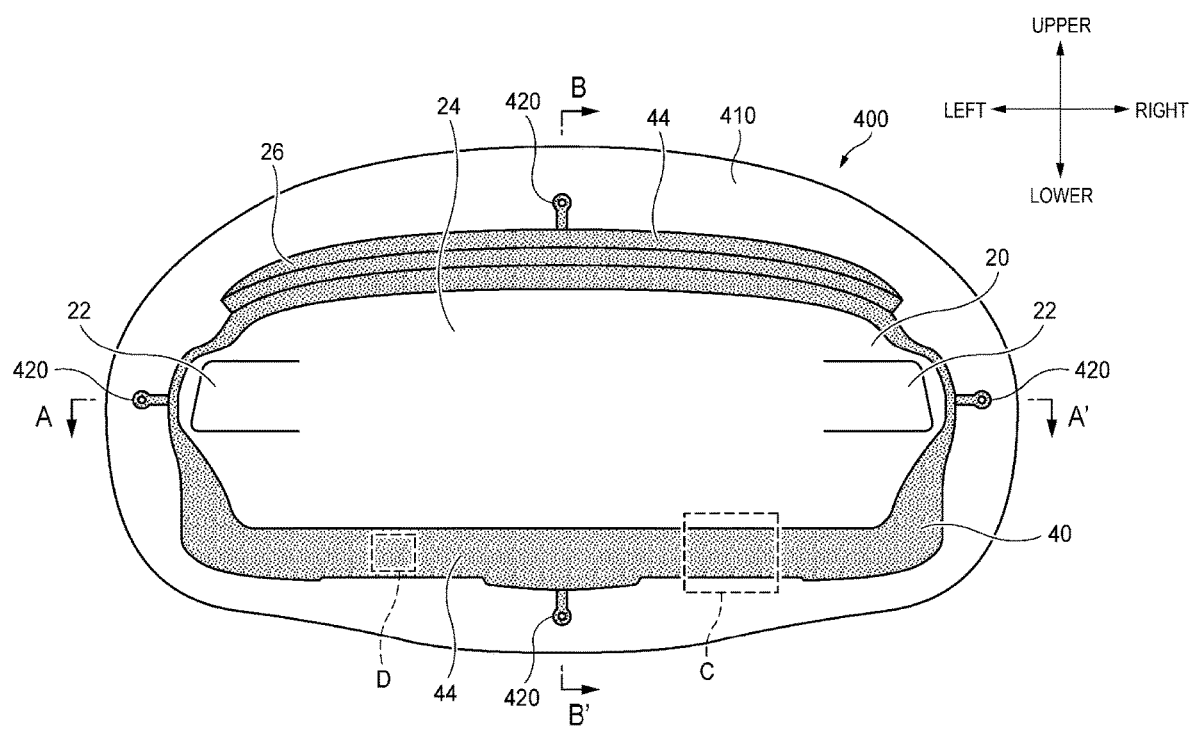
FIG. 3 is a front view of a protruding portion attached vehicle rear module according to the first embodiment.
Figure 4:
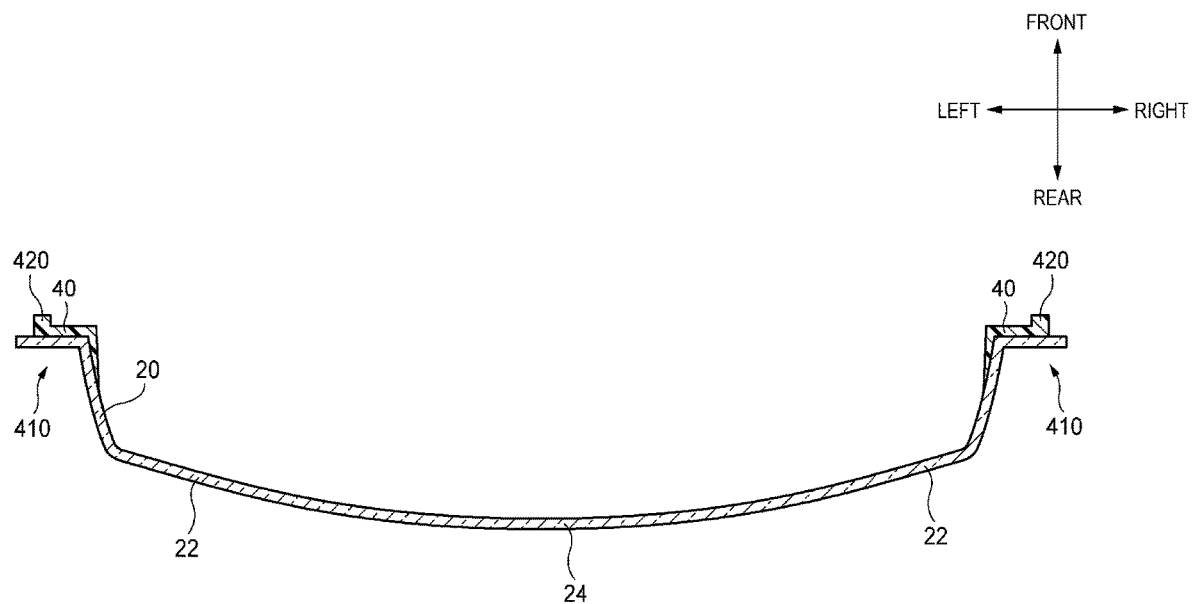
FIG. 4 is a sectional view taken along a line A-A' in FIG. 3.
Figure 5:
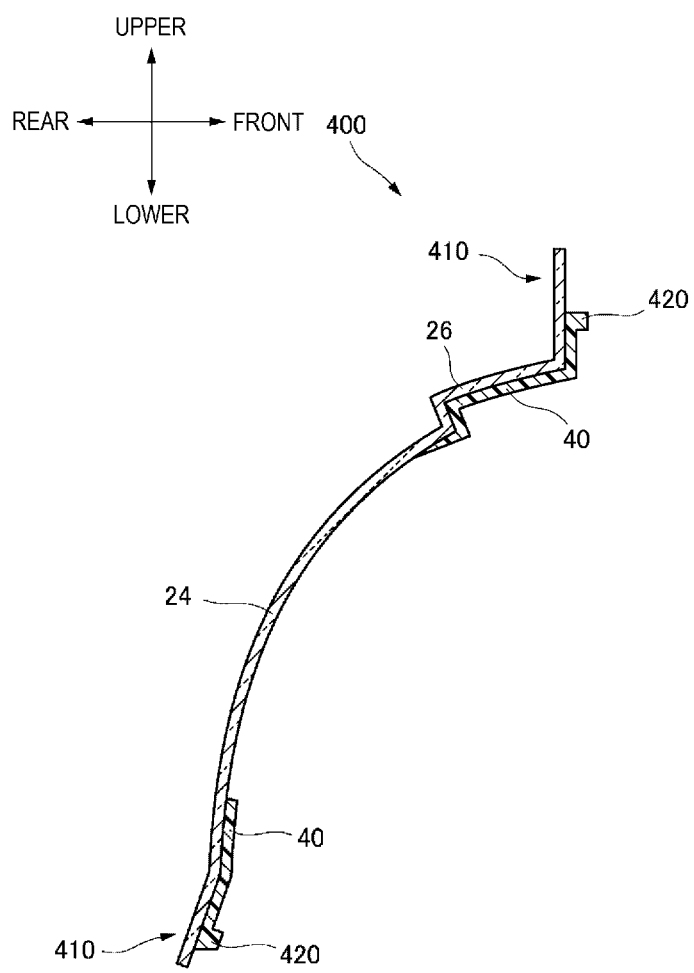
FIG. 5 is a sectional view taken along a line B-B' in FIG. 3.

Next, the vehicle rear module 4 according to the present embodiment will be described in detail with reference to FIGS. 3 to 5. FIG. 3 is a front view of a vehicle rear module (hereinafter, referred to as a protruding portion attached vehicle rear module 400) immediately after being molded by a manufacturing method according to the present embodiment described later. FIG. 4 is a sectional view taken along the line A-A' in FIG. 3. FIG. 5 is a sectional view taken along the line B-B' in FIG. 3.

The protruding portion attached vehicle rear module 400 includes a protruding portion 410 extending in any one of the upper-lower direction and the left-right direction of the vehicle rear module 4 (FIGS. 3 to 5). In other words, the protruding portion 410 extends in a direction in which a main plane of the window portion 24 of the clear member 20 extends. Injection gate marks 420 are formed on the protruding portion 410. The vehicle rear module 4 is formed by removing the protruding portion 410. The protruding portion attached vehicle rear module 400 is formed by two-color molding the clear member 20 and the colored member 40. For convenience of description, the clear member 20 and the colored member 40 of the vehicle rear module 4 and those of the protruding portion attached vehicle rear module 400 are denoted by the same reference numerals and will be described as the same members.

As described above, the clear member 20 monolithically includes the window portion 24 and the lamp portions 22, and may further include a spoiler portion 26 (FIGS. 3 to 5). The window portion 24 is gently curved in the left-right direction from a central portion of the clear member 20 in the left-right direction. The lamp portions 22 are provided in a pair at left and right positions of the clear member 20, and protrude rearward from a main curved surface of the clear member 20 (FIGS. 1 and 2). A portion of each of left and right end portions of the clear member 20 (substantially central portion in the upper-lower direction) extends in the substantially front-rear direction of the vehicle 1, and forms a side surface portion of each of the lamp portions 22 (see FIGS. 1, 2, and 4). In addition, when the clear member 20 has a small thickness at the lamp portions 22, the lamp portions 22 can sufficiently transmit light of the lamps, which is preferred. The spoiler portion 26 extends in the left-right direction above the clear member 20, and protrudes rearward from the main curved surface of the clear member 20 (FIGS. 3 and 5). The spoiler portion 26 is curved downward as extending in the left-right direction from a central portion thereof in the left-right direction when the window portion 24 is seen in a plan view (FIG. 3).

The colored member 40 is located inside the vehicle 1 relative to the clear member 20 when mounted on the vehicle 1 (FIGS. 4 and 5). The colored member 40 is bonded to the clear member 20 so as to border an outer edge of the clear member 20 when the window portion 24 of the clear member 20 is seen in a plan view (FIG. 3). Specifically, the colored member 40 is formed continuously along the outer edge of the clear member 20. The "border" mentioned here refers to a configuration in which the frame-shaped colored member 40 is attached to a back surface (a surface facing front of the vehicle 1) of the clear member 20 along the outer edge so as not to come out of the outer edge of the clear member 20. The colored member 40 is also provided on a back surface (a surface facing front of the vehicle 1) of the spoiler portion 26 of the clear member 20.

A hard coat layer that prevents damage to the clear member 20 is provided on surfaces of the window portion 24 and the lamp portions 22 of the clear member 20 which face rear of the vehicle 1. The hard coat layer is preferred to have higher scratch resistance at the lamp portions than at the window portion.

(Method of Manufacturing Vehicle Rear Module)

Figure 6:
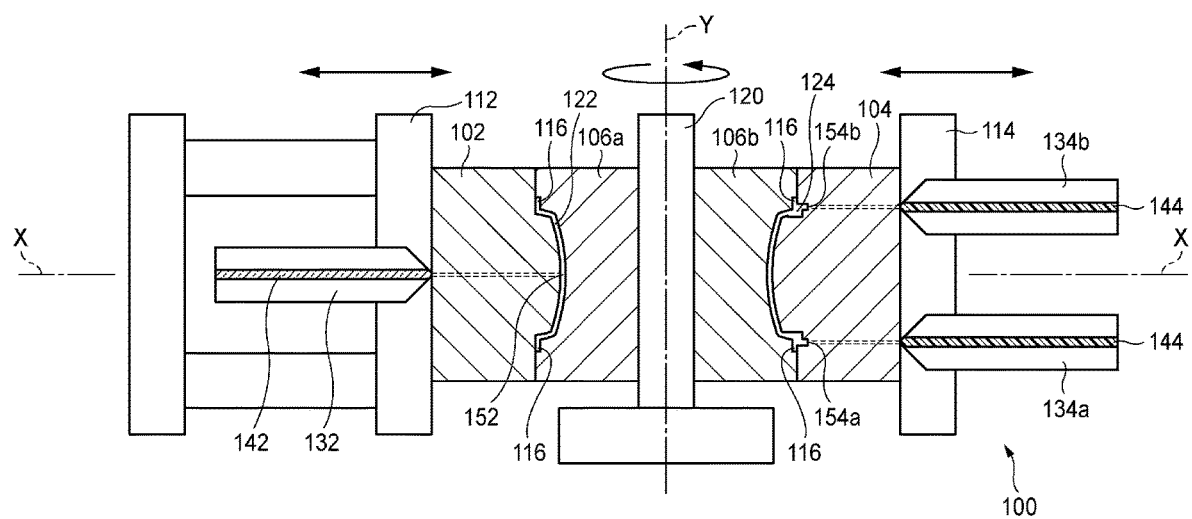
FIG. 6 is a schematic view showing a configuration of a mold according to the first embodiment.

Next, a method of manufacturing the vehicle rear module 4 according to the present embodiment will be described with reference to FIGS. 6 to 10. FIG. 6 is a schematic view showing a configuration of a mold 100 used in the present embodiment. FIGS. 7A to 10 are process diagrams showing states in which the protruding portion attached vehicle rear module 400 is molded with the mold 100.

First, the configuration of the mold 100 will be described with reference to FIG. 6. The mold 100 is a so-called two-color molding die including opposing portions. The mold 100 includes a first core mold 102 and a second core mold 104 facing each other on an X axis extending in a horizontal direction, a rotation member 120 provided between the first core mold 102 and the second core mold 104 and is rotatable about a Y axis extending in a vertical direction orthogonal to the X axis, a pair of cavity molds 106a, 106b having the same shape and fixed to the rotation member 120 in a back-to-back state relative to the Y axis, a movable platen 112 that supports the first core mold 102, and a fixed platen 114 that supports the second core mold 104. Each of the cavity molds 106a, 106b includes a protruding portion forming portion 116 corresponding to the protruding portion 410.

The rotation member 120 is movable in an X-axis direction relative to the fixed platen 114, and the movable platen 112 is movable in the X-axis direction relative to the rotation member 120. In FIG. 6, relative movement directions are indicated by arrows.

When a material is supplied, the mold 100 injects a transparent resin 142 from a single resin injection hole 152 to a first cavity 122 formed between the first core mold 102 and the cavity mold 106a. The transparent resin 142 is supplied from a first heating cylinder 132 supported by the movable platen 112. The single resin injection hole 152 is provided to inject the transparent resin 142 to the protruding portion forming portion (not shown). When a material is supplied, the mold 100 injects a coloring resin 144 from a plurality of resin injection holes 154a, 154b to a second cavity 124 formed between the second core mold 104 and the cavity mold 106b. The coloring resin 144 is supplied from a plurality of second heating cylinders 134a, 134b supported by the fixed platen 114. The plurality of resin injection holes 154a, 154b are provided to inject the coloring resin 144 to the protruding portion forming portion 116.

Figure 7A:
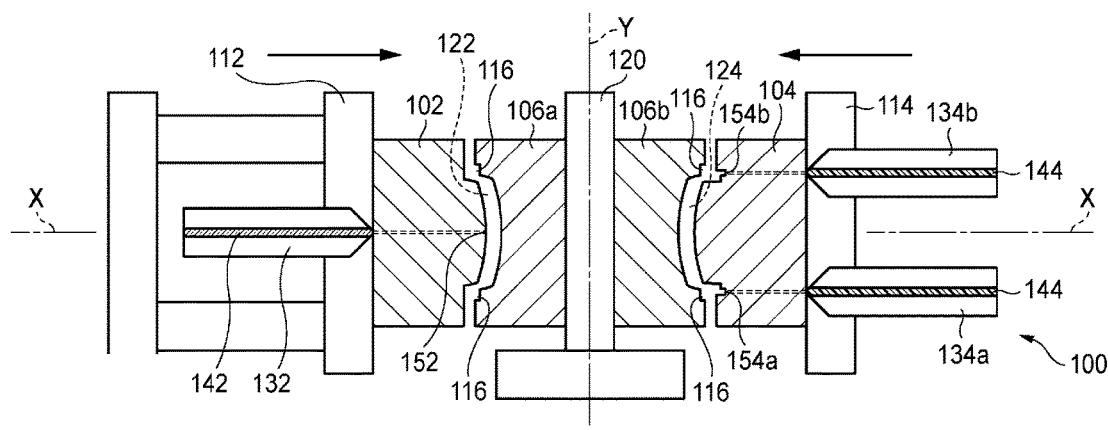
FIGS. 7A and 7B are process diagrams showing a state in which the protruding portion attached vehicle rear module according to the first embodiment is formed.
Figure 7B:
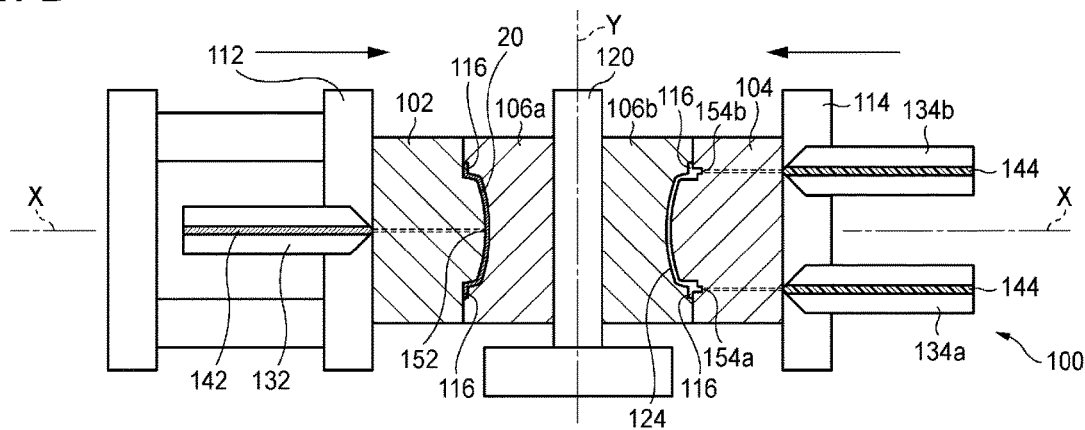

Next, a method of manufacturing the protruding portion attached vehicle rear module 400 will be described with reference to FIGS. 7A to 10. First, the first core mold 102 and the second core mold 104 are brought close to the pair of cavity molds 106a, 106b (FIG. 7A). At this time, the first core mold 102 and the second core mold 104 are not abutted against the pair of cavity molds 106a, 106b at all. Subsequently, the transparent resin 142 supplied from the first heating cylinder 132 is injected from the single resin injection hole 152 to the first cavity 122. After a predetermined amount of the transparent resin 142 is injected, the first core mold 102, the second core mold 104, and the pair of cavity molds 106a, 106b are clamped to compress (press) the transparent resin 142 (FIG. 7B). In this manner, the clear member 20 is molded.

Figure 8A:
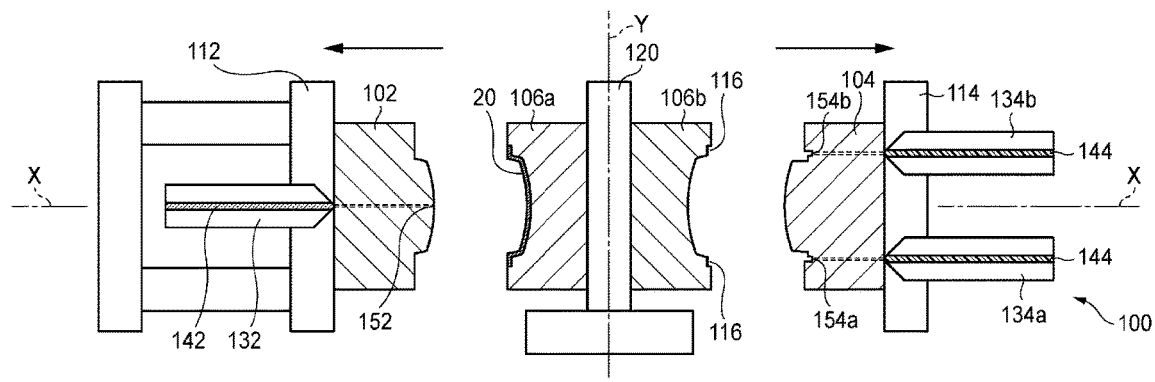
FIGS. 8A and 8B are process diagrams showing a state in which the protruding portion attached vehicle rear module according to the first embodiment is formed.
Figure 8B:
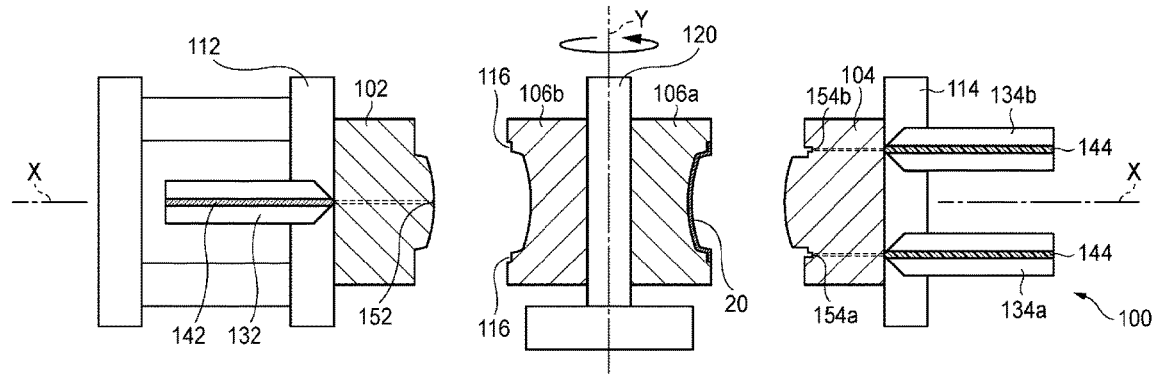

Next, the first core mold 102, the second core mold 104, and the pair of cavity molds 106a, 106b are opened (FIG. 8A). The mold 100 is configured such that the clear member 20 is separated from the first core mold 102 while being held by the cavity mold 106a. In this state, the rotation member 120 is rotated by 180° about the Y axis (FIG. 8B).

Figure 9A:
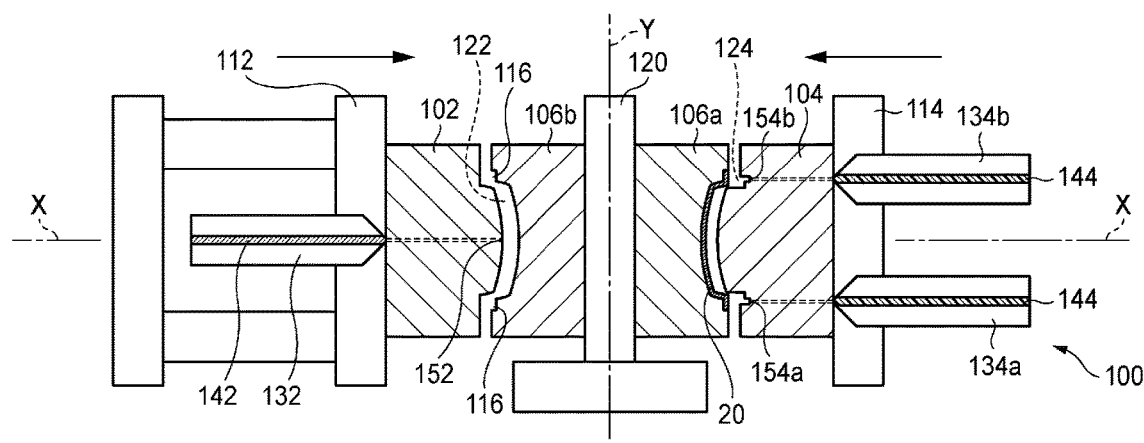
FIGS. 9A and 9B are process diagrams showing a state in which the protruding portion attached vehicle rear module according to the first embodiment is formed.
Figure 9B:
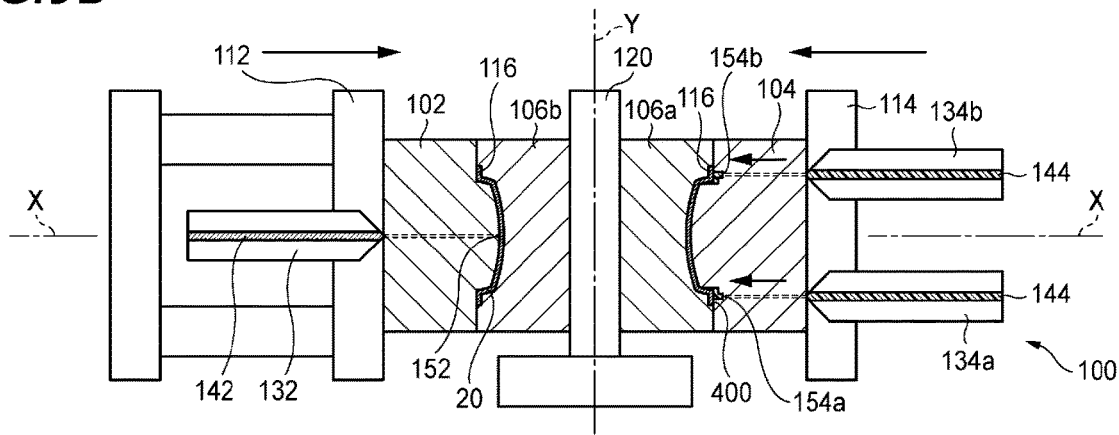

Next, the first core mold 102 and the second core mold 104 are brought close to the pair of cavity molds 106a, 106b (FIG. 9A). At this time, the first core mold 102 and the second core mold 104 are not abutted against the pair of cavity molds 106a, 106b at all. Then, the transparent resin 142 supplied from the first heating cylinder 132 is injected from the single resin injection hole 152 to the first cavity 122 again. After a predetermined amount of the transparent resin 142 is injected, the first core mold 102, the second core mold 104, and the pair of cavity molds 106a, 106b are clamped to compress (press) the transparent resin 142 (FIG. 9B). In this manner, the clear member 20 is formed continuously.

Together with the forming of the clear member 20 in the first cavity 122, the protruding portion attached vehicle rear module 400 is molded in the second cavity 124. In forming the clear member 20, the first core mold 102, the second core mold 104, and the pair of cavity molds 106a, 106b are clamped to compress (press) the transparent resin 142. Thereafter, the coloring resin 144 supplied from the second heating cylinder 134a, 134b is injected from the plurality of resin injection holes 154a to 153b to portions in the second cavity 124 other than the clear member 20 to form the colored member 40 (FIG. 9B). Accordingly, the protruding portion attached vehicle rear module 400 monolithically including the clear member 20 and the colored member 40 is formed.

Figure 10A:
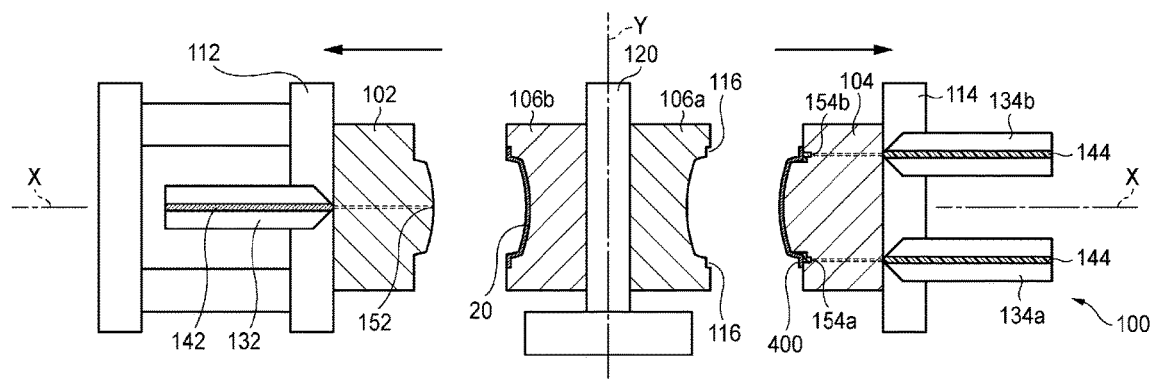
FIGS. 10A and 10B are process diagrams showing a state in which the protruding portion attached vehicle rear module according to the first embodiment is formed.
Figure 10B:
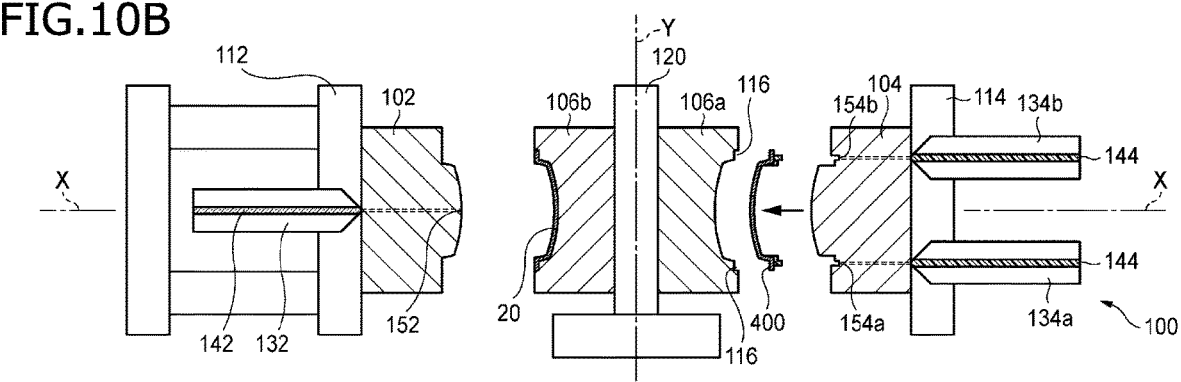

Finally, the first core mold 102, the second core mold 104, and the pair of cavity molds 106*a*, 106*b* are opened (FIG. 10A). When the mold 100 is opened, the protruding portion attached vehicle rear module 400 is attached to the second core mold 104. The protruding portion attached vehicle rear module 400 is detached in this state (FIG. 10B). The detachment is performed by pushing out the protruding portion attached vehicle rear module 400 attached to the second core mold 104 with a push-out pin (not shown) and grasping the protruding portion attached vehicle rear module 400 with a detachment device (not shown).

Here, the clear member 20 formed by injecting the transparent resin 142 from the single resin injection hole 152 can confirm presence of strain by providing the clear member 20 in front of a backlight light source and observing the clear member 20 through a polarizing film that is in further front of the clear member 20. Specifically, the strain can be evaluated by a method of JISR 3211 (automotive safety glass) and JISR 3212 (automotive safety glass test method). When the clear member is formed by injecting the resin from the plurality of resin injection holes and the above evaluation is performed, for example, the strain due to residual stress is confirmed at a confluence of resin injected from other resin injection holes. Accordingly, it is possible to determine molding using a single resin injection hole or molding using a plurality of resin injection holes.

By removing the protruding portion 410 of the protruding portion attached vehicle rear module 400 obtained in this manner, the vehicle rear module 4 can be obtained. The hard coat layer is formed before or after the protruding portion 410 is removed from the protruding portion attached vehicle rear module 400.

(Effects)

According to the method of manufacturing the vehicle rear module 4 according to the present embodiment, the clear member 20 of the vehicle rear module 4 is molded with the transparent resin 142 injected from the single resin injection hole 152 so that it is possible to make a resin flow line (weld) less likely to appear. The colored member 40 which is not required to transmit light is molded with the coloring resin 144 injected from the plurality of resin injection holes 154*a*, 154*b* so that the molding can be facilitated and the strength of the vehicle rear module 4 can be improved. Accordingly, the vehicle rear module 4 having a complicated shape and high commerciality can be properly manufactured.

The method of manufacturing the vehicle rear module 4 according to the present embodiment described an aspect for molding the protruding portion attached vehicle rear module 400. By providing the protruding portion 410, it is possible to inject more resin than an amount of resin equivalent to the vehicle rear module 4, and to prevent a molding failure due to insufficient filling of the resin at the time of compression.

Further, when a portion of an end portion of the vehicle rear module 4 is bent relative to the window portion 24 (the side surface portion of the lamp portions 22 in the present embodiment), pressure may not be sufficiently applied to the portion of the end portion when the mold 100 is closed. In response to this, as long as each of the cavity molds 106*a*, 106*b* of the mold 100 includes the protruding portion forming portion 116, the pressure is easily applied to the protruding portion forming portion 116 and the resin is easily filled in the portion where the end portion is formed. Accordingly, a molding failure can be prevented.

Since the resin injection holes 152, 154*a*, 154*b* inject a resin material into the protruding portion forming portion 116, the injection gate marks 420 formed due to the resin injection holes 152, 154*a*, 154*b* are formed on the protruding portion 410. The injection gate marks 420 are formed on the protruding portion 410 to be removed so that it is possible to avoid a decrease in visibility of the vehicle rear module 4 due to the injection gate marks 420.

In order to balance the design and the strength, the present inventors first studied to form an entire rear module with the clear member 20. The clear member 20 can provide good aesthetics. Specifically, the clear member 20 including the window portion 24 and the lamp portions 22 that can transmit light is taken as an external component of a back door that is a portion of a vehicle body panel in the related art so that it is possible to express a new design that the window portion 24 and the lamp portions 22 are monolithic. Further, changing a mode of light transmitted through the lamp portions 22 can provide new aesthetics and the design is improved.

However, in this case, the inventors found that the transmittance of the clear member 20 decreases when the thickness thereof increases as a result of ensuring the strength, and it is difficult for the clear member 20 to function as the window portion 24. Therefore, the inventors found that, when a member ensuring the strength is provided separately from the clear member 20, it is easy to ensure the necessary strength while taking advantage (design performance) of the clear member 20.

According to the vehicle back door 3 in the above embodiment, the colored member 40 of the vehicle rear module 4 is provided inside the vehicle 1 relative to the clear member 20. By doing so, the colored member 40 that serves as a blindfold of a vehicle interior is provided inside and the clear member 20 appears on an exterior. Accordingly, the appearance design is good. Further, the colored member 40 can ensure the strength of the entire vehicle rear module 4 without increasing the thickness of the clear member 20, and it is possible to provide a vehicle back door having high strength and good appearance design.

The entire rear module can be formed by a single member (clear member) only and the strength can be ensured by increasing the thickness of the member. However, when the thickness of the clear member is increased, the rear module itself becomes heavy and the transparency becomes low. In a large-sized and complicated rear module including a window portion and a lamp portion, it is difficult to achieve high strength, light weight, and sufficient transparency at the same time with a single member.

Therefore, the present inventors found that, when a member (colored member) ensuring the strength is provided separately from a clear member, it is easy to ensure the necessary strength while providing light weight and sufficient transparency.

According to the vehicle back door 3 in the above embodiment, the colored member 40 borders the outer edge of the clear member 20. By doing so, the strength of the vehicle rear module 4 can be improved by combining the clear member 20 and the colored member 40. Therefore, even when the clear member 20 is thin and relatively low in strength, the strength can be complemented for by the colored member 40. Accordingly, the strength necessary for the entire vehicle rear module 4 can be satisfied. Since the clear member 20 can be made thin, light weight and sufficient transparency can be ensured. Accordingly, it is possible to provide the vehicle back door 3 having high strength and high commerciality.

(Preferred Aspects)

Figure 11:
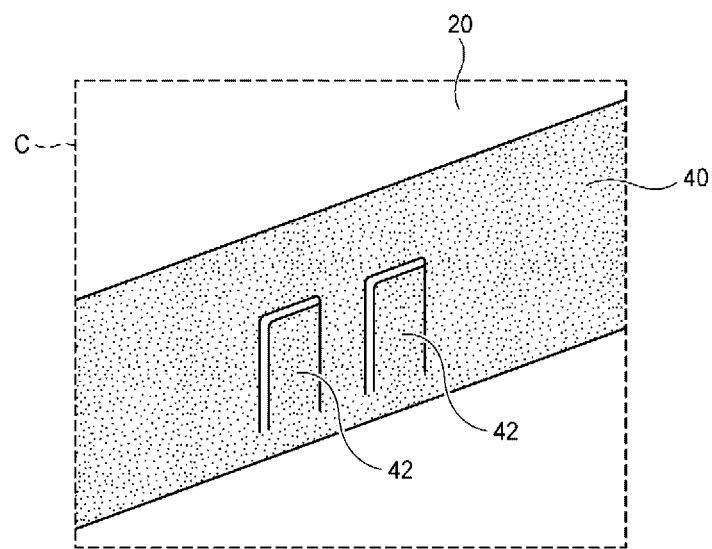
FIG. 11 is an enlarged view of a back side of a portion indicated by C in FIG. 3 according to a preferred aspect of the first embodiment.

Here, a preferred aspect of the above embodiment will be described with reference to FIG. 11. FIG. 11 is an enlarged view of a back side of a portion indicated by C in FIG. 3 according to the preferred aspect. As shown in FIG. 11, the colored member 40 of the vehicle rear module 4 according to the above embodiment is preferred to include an assembling protrusion 42 protruding toward the inside of the vehicle 1. It is preferred that the vehicle back door 3 according to the above embodiment is formed by attaching the colored member 40 to the back door inner 5 via the assembling protrusion 42. The protrusion 42 may be appropriately received in a plurality of locations in the left-right direction and the upper-lower direction of the colored member 40.

A glass rear window and a back door inner in the related art are fixed by a urethane-based adhesive. When the vehicle rear module 4 is equipped with a lamp unit, a sensor, or the like for multiple functions, the weight thereof increases and stress in a bonding portion increases, which may cause peeling of the bonding portion.

On the other hand, in the above embodiment, the colored member is provided on a vehicle inner side of the vehicle rear module. Accordingly, the assembling protrusion can be formed on the colored portion. In the preferred aspect, the colored member 40 including the assembling protrusion 42 is attached to the back door inner 5 via the assembling protrusion 42 so that the assembling protrusion 42 counteracts an external force acting on the vehicle rear module. Accordingly, the stress acting on the vehicle rear module 4 can be dispersed and the peeling of the bonding portion and damage of the vehicle rear module 4 can be prevented.

Figure 12:
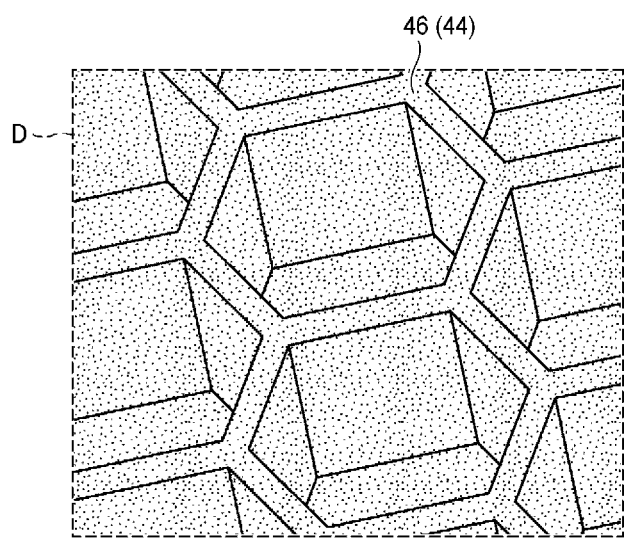
FIG. 12 is an enlarged view of a back side of a portion indicated by D in FIG. 3 according to a preferred aspect of the first embodiment.

Another preferred aspect of the above embodiment will be described with reference to FIG. 12. FIG. 12 is an enlarged view of a back side of a portion indicated by D in FIG. 3 according to the preferred aspect. The colored member 40 includes a linear portion 44 extending in the left-right direction of the vehicle (see FIG. 3). As shown in FIG. 12, the linear portion 44 is preferred to be formed with a honeycomb structure 46. The honeycomb structure 46 shown in FIG. 12 appears a hexagonal shape when viewed from a direction intersecting an extending direction of the linear portion 44.

By forming the linear portion 44 of the colored member 40 with the honeycomb structure 46, it is possible to prevent expansion and contraction of the colored member 40 in a longitudinal direction due to temperature change, and to obtain a vehicle rear module having high durability against temperature change. In addition, although the colored member 40 may contain a filler or the like in order to improve the strength, the colored member 40 having the honeycomb structure 46 can improve the strength even without the filler. Therefore, an increase in weight due to the use of the filler can be avoided and a lightweight vehicle rear module can be obtained.

Another preferred aspect of the above embodiment will be described. Although the method of manufacturing the clear member 20 of the vehicle rear module 4 described an aspect in which the transparent resin 142 is injected to the first cavity 122 of the mold 100 (see FIGS. 7A and 7B), a film on which heating rays are printed may be accommodated in the first cavity 122 when the clear member 20 is formed so that a defogger may be formed by insert molding. For example, the defogger may be obtained by inserting the film into the window portion 24 of the clear member 20.

According to the insert molding using the film on which heating rays are printed, time and cost for forming the defogger can be expected to be reduced as compared with a case where the heating rays are formed after forming the clear member 20 by a dispenser or the like. Further, it is also difficult to form heating rays by screen printing in the vehicle rear module 4 having a three-dimensional shape. On the other hand, heating rays can be easily provided in the vehicle rear module 4 in a case of insert molding. Further, by mixing an infrared absorbing agent such as tungsten oxide into the film on which heating rays are printed, it is possible to further improve the heat generation efficiency, and to exhibit a superior cooling and snow preventing effect.

(Various Modifications)

In the above embodiment, the colored member 40 is formed by injecting the coloring resin 144 to the second cavity 124 in which the clear member 20 is disposed. The coloring resin may be injected from the plurality of resin injection holes to another second cavity using, for example, a mold different from the above embodiment. The colored member may be formed before the clear portion does, and may be disposed in another first cavity. The transparent resin may be injected into the first cavity to form the clear member.

The above embodiment described an aspect in which the vehicle rear module 4 is formed by monolithically forming the clear member 20 and the colored member 40 by two-color molding. Alternatively, for example, the clear member 20 and the colored member 40 may be separately formed and be bonded to each other using an adhesive, be welded, or be fitted via ribs or the like, so as to form the vehicle rear module 4. However, the bonding between the clear member 20 and the colored member 40 is strong when molding is performed by two-color molding, and the vehicle rear module 4 can be formed in a continuous process, which is thus preferred.

Although the above embodiment described the vehicle rear module 4 including the lamp portions 22 that transmit light of the rear combination lamps, the present invention is not limited to a combination of a plurality of lamps such as the rear combination lamps. The lamp portions 22 may transmit light of a stop lamp, a turn signal lamp, a back lamp, a tail lamp, a rear fog lamp, and a day lamp. The lamp portions 22 may also transmit light of rear combination lamps that are a combination of these lamps. In addition to the pair of left and right lamp portions 22, a portion that transmits light of a lamp may be provided. For example, a portion that transmits light of a high mount stop lamp may be provided.

Further, a member such as a lamp, a cleaner, a wiper, a sensor, or a defogger may be mounted on the vehicle rear module 4 according to the above embodiment. As the lamp, for example, the lamps described above can be mounted. Examples of the sensor include a LiDAR, a camera, and radar. In this case, when a sensor mounting portion for a LiDAR, radar, or the like has a small thickness, the transmittance increases and sensitivity of the sensor increases.

In the above embodiment, polycarbonate (PC) is used as an example of the material of the clear member 20 and the colored member 40, and a resin material such as an acrylic resin (PMMA), a cycloolefin resin, or a polystyrene resin may also be used.

Second Embodiment

Hereinafter, a second embodiment of the present invention will be described in detail with reference to the drawings. The second embodiment is the same as the first embodiment except for a configuration of a portion of a vehicle rear module and a protruding portion attached vehicle rear module. A method of manufacturing the vehicle rear module according to the second embodiment is also the same as that of the first embodiment. Therefore, the same components as those described in the first embodiment are denoted by the same reference numerals in the second embodiment, and descriptions thereof are omitted.

Figure 13:
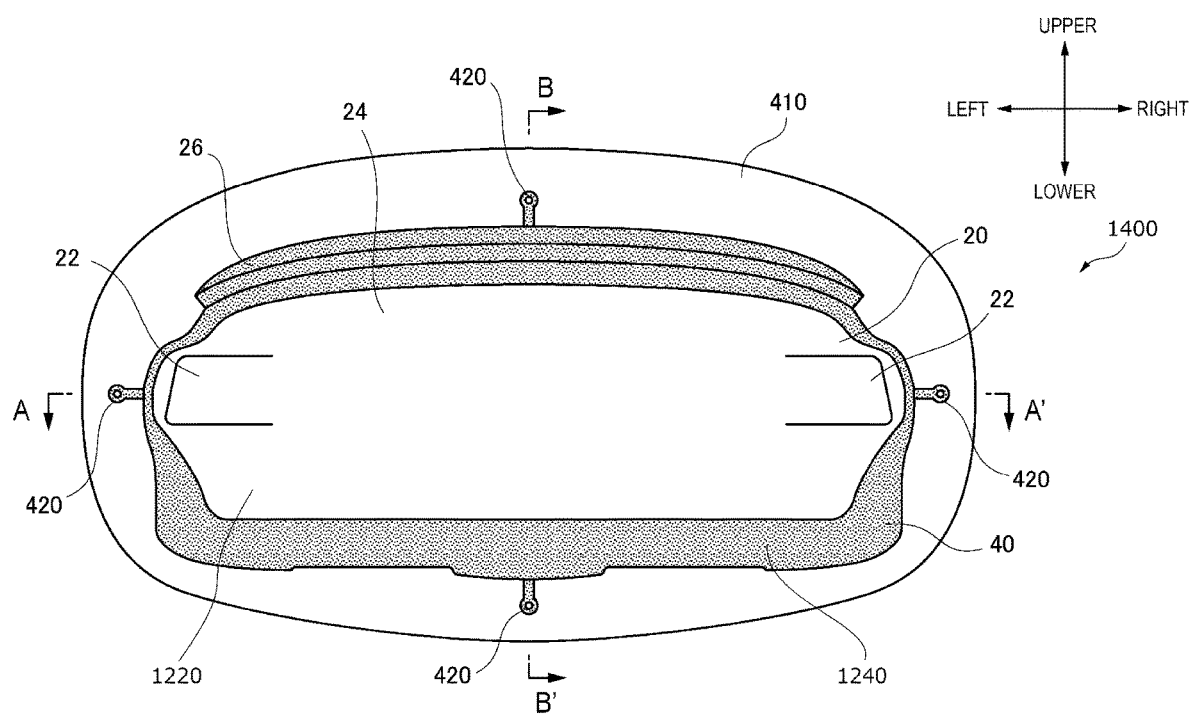
FIG. 13 is a front view of a protruding portion attached vehicle rear module according to a second embodiment.
Figure 14:
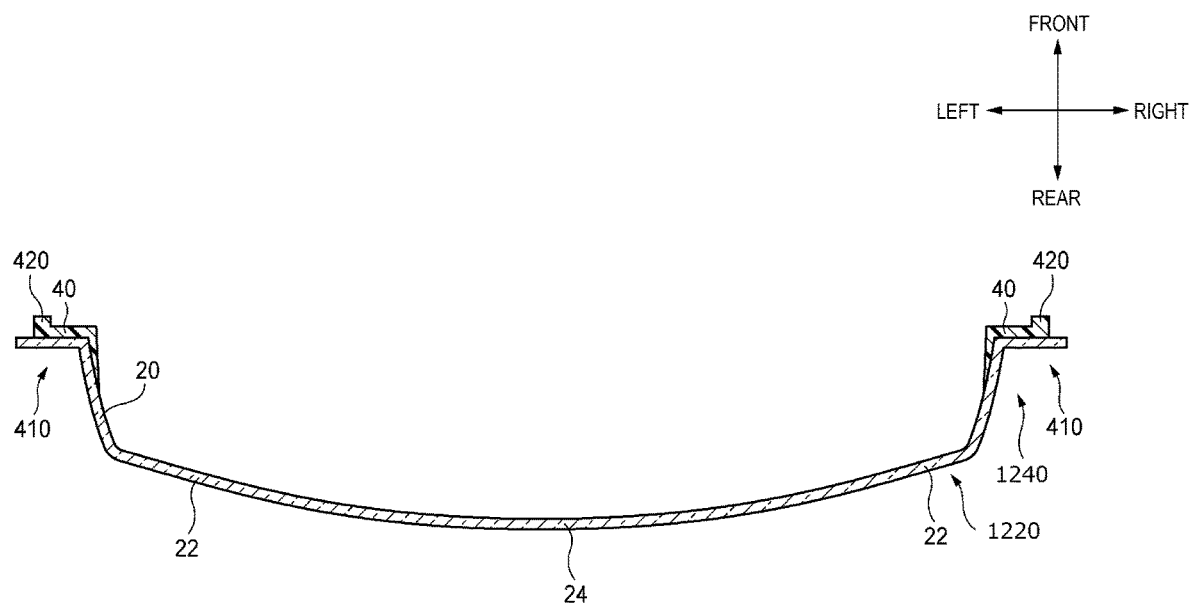
FIG. 14 is a sectional view taken along the line A-A' in FIG. 13.
Figure 15:
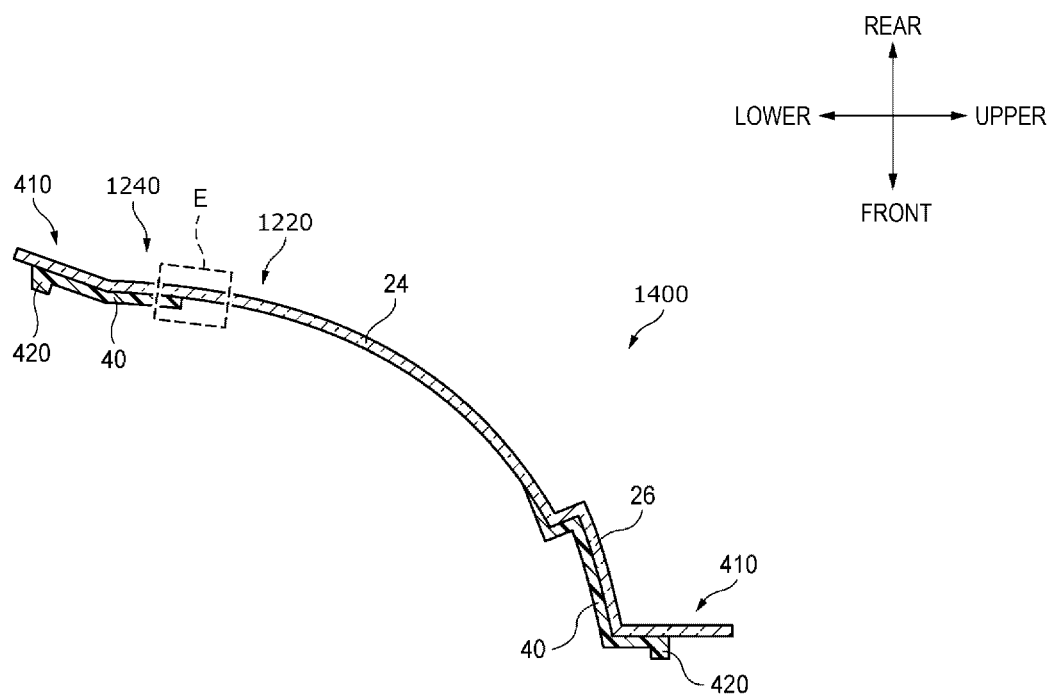
FIG. 15 is a sectional view taken along the line B-B' in FIG. 13.
Figure 16:
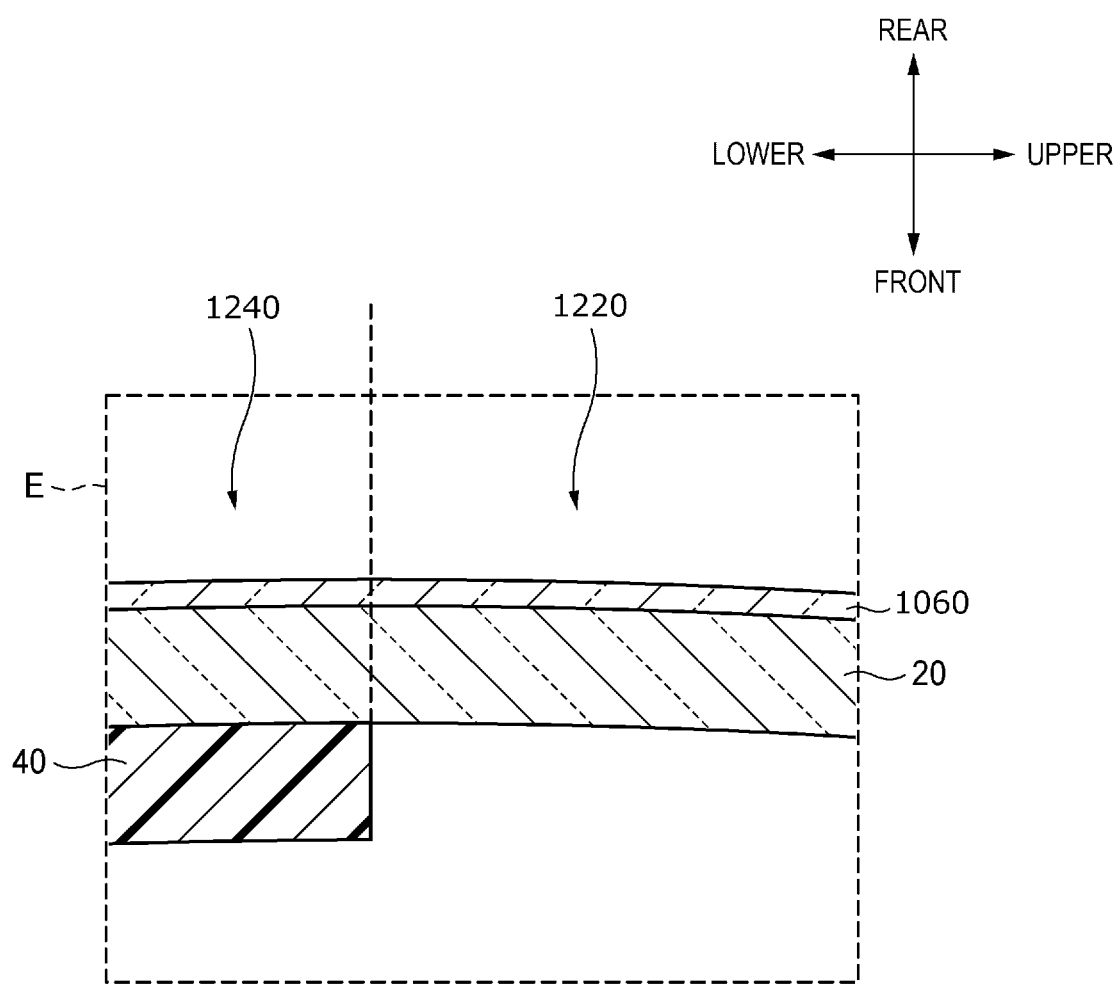
FIG. 16 is an enlarged schematic view of a portion indicated by E in FIG. 15.

The vehicle rear module according to the second embodiment will be described in detail with reference to FIGS. 13 to 16. FIG. 13 is a front view of a vehicle rear module (hereinafter, referred to as a protruding portion attached vehicular rear module 1400) immediately after being molded by the same method as the manufacturing method described in the first embodiment. FIG. 14 is a sectional view taken along the line A-A' in FIG. 13. FIG. 15 is a sectional view taken along the line B-B' in FIG. 13. FIG. 16 is an enlarged schematic view of a portion indicated by E in FIG. 15.

The protruding portion attached vehicular rear module 1400 includes a portion (clear element 1220) in which no colored member 40 is bonded to the clear member 20 and front can be visually recognized when the window portion 24 is viewed in a plan view (when viewed from rear of a vehicle), and a portion (colored element 1240) in which the colored member 40 is bonded to the clear member 20 and front is shielded when the window portion 24 is viewed in a plan view (when viewed from rear of the vehicle) (FIGS. 13, 14, and 15). The clear element 1220 is a portion monolithically including the lamp portions 22 and the window portion 24. The colored element 1240 visually shields at least a part of the inside of the vehicle from the outside when viewed from rear of the vehicle.

A hard coat layer 1060 that prevents damage to the clear member 20 is provided on surfaces of the window portion 24 and the lamp portions 22 of the clear member 20 which face rear of the vehicle 1. As shown in FIG. 16, the hard coat layer 1060 is thinner than the clear member 20. The hard coat layer 1060 is provided on a surface of the clear element 1220 which faces the outside of the vehicle (FIG. 16). Specifically, the hard coat layer 1060 is provided over the surface of the clear element 1220 which faces the outside of the vehicle and a surface of the colored element 1240 which faces the outside of the vehicle (FIG. 16). More specifically, the hard coat layer 1060 is provided over the entire surface of the clear element 1220 which faces the outside of the vehicle and the entire surface of the colored element 1240 which faces the outside of the vehicle. The hard coat layer 1060 is preferred to have higher scratch resistance at the lamp portions than at the window portion.

The hard coat layer 1060 is made of an acrylic resin or an acrylic urethane resin, a coloring material, and silica nanoparticles. An example of the acrylic resin or the acrylic urethane resin includes a thermosetting or ultraviolet curing resin. Considering application to a vehicle rear module having a complicated three-dimensional shape, the thermosetting resin is preferred. An example of the coloring material includes materials such as pigments or dyes, and is not particularly limited as long as the coloring material can adjust the transmittance of the hard coat layer 1060 by changing an amount thereof. The silica nanoparticles have a particle diameter on an order of nm and are not particularly limited as long as the silica nanoparticles do not significantly disturb the transmission of light. For example, those having an average particle diameter of 10 nm to 200 nm can be used.

(Effects)

A window portion provided in a vehicle rear module made of resin tends to be low in scratch resistance as compared with a window portion made of glass in the related art. Although it is conceivable to form a hard coat layer containing a filler in order to improve the scratch resistance, there is a concern that the transparency of light is significantly lowered by the filler.

Further, the transmittance of a window portion on a vehicle rear side has been set to be low from a viewpoint of privacy protection and the like in recent years. However, it is difficult to implement a high transmittance to some extent while ensuring scratch resistance with the filler.

In the vehicle rear module according to the second embodiment, the hard coat layer 1060 including the silica nanoparticles is provided on the surface of the window portion 24 which face rear of the vehicle 1. The silica nanoparticles impart the scratch resistance and the transparency is not lowered. The coloring material is also provided in combination with the silica nanoparticles. Accordingly, the transmittance can be set to be low, and the privacy of an occupant can be protected. That is, the hard coat layer 1060 that balances both scratch resistance and transmittance can be formed. Accordingly, it is possible to provide a vehicle rear module including the window portion 24 having good scratch resistance and capable of protecting the privacy of the occupant.

In the vehicle rear module, the hard coat layer 1060 is provided on the surface of the colored element 1240 which faces rear of the vehicle 1. By providing the same hard coat layer 1060 for the window portion 24 and the colored element 1240, it is possible to implement a uniform appearance.

In the vehicle rear module, the hard coat layer 1060 is provided over the surface of the clear element 1220 and the surface of the colored element 1240 which face rear of the vehicle 1. By providing the same hard coat layer 1060 over a boundary between the clear element 1220 and the colored element 1240, a further uniform appearance can be implemented.

In the vehicle rear module, the hard coat layer 1060 is provided over the entire surface of the clear element 1220 and the entire surface of the colored element 1240 which face rear of the vehicle 1. By providing the same hard coat layer 1060 over the entire clear element 1220 and the entire colored element 1240, a particularly uniform appearance can be implemented.

(Various Modifications)

In the second embodiment, polycarbonate (PC) is also used as an example of a material of the clear member 20 and the colored member 40 as described in the first embodiment, and a resin material such as an acrylic resin (PMMA), a cycloolefin resin, or a polystyrene resin may also be used. The clear member 20 and the hard coat layer 1060 may also contain an ultraviolet absorber UVA. The ultraviolet absorber UVA can further improve the durability.

Another hard coat layer may be further formed on the hard coat layer 1060 according to the second embodiment. The other hard coat layer may be made of an acrylic resin, an acrylic urethane resin, or a silicone resin. The other hard coat layer may also include the silica nanoparticles and/or the coloring material described in the above embodiment. The other hard coat layer can be formed by curing a thermosetting or ultraviolet curable resin material. When the other hard coat layer does not contain the coloring material, a transparent hard coat layer is preferred to be formed on the hard coat layer 1060 to implement an appearance with a sense of depth.

Third Embodiment

Hereinafter, a third embodiment of the present invention will be described in detail with reference to the drawings. The third embodiment is the same as the first embodiment except for a configuration of a portion of a vehicle rear module and a protruding portion attached vehicle rear module. A method of manufacturing the vehicle rear module according to the third embodiment is also the same as that of the first embodiment. Therefore, the same components as those described in the first embodiment are denoted by the same reference numerals in the third embodiment, and descriptions thereof are omitted.

(Vehicle Rear Module Provided with Planar Heater)

Figure 17:
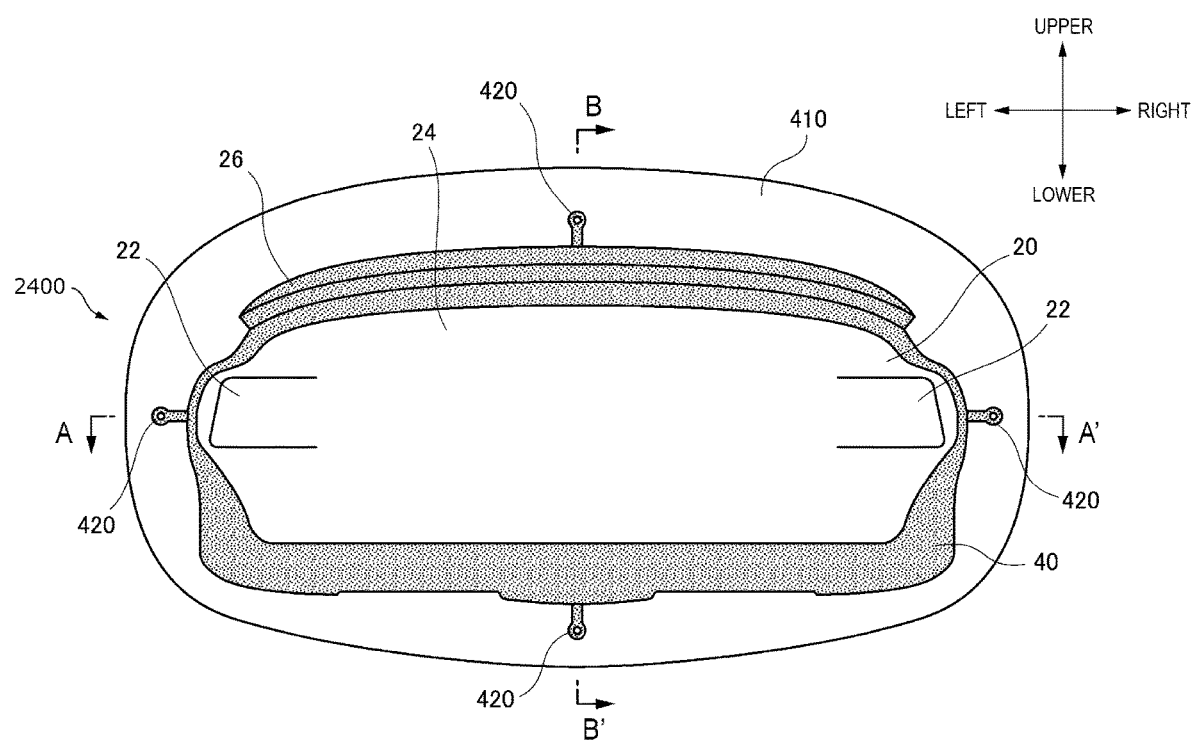
FIG. 17 is a front view of a protruding portion attached vehicle rear module according to a third embodiment.
Figure 18:
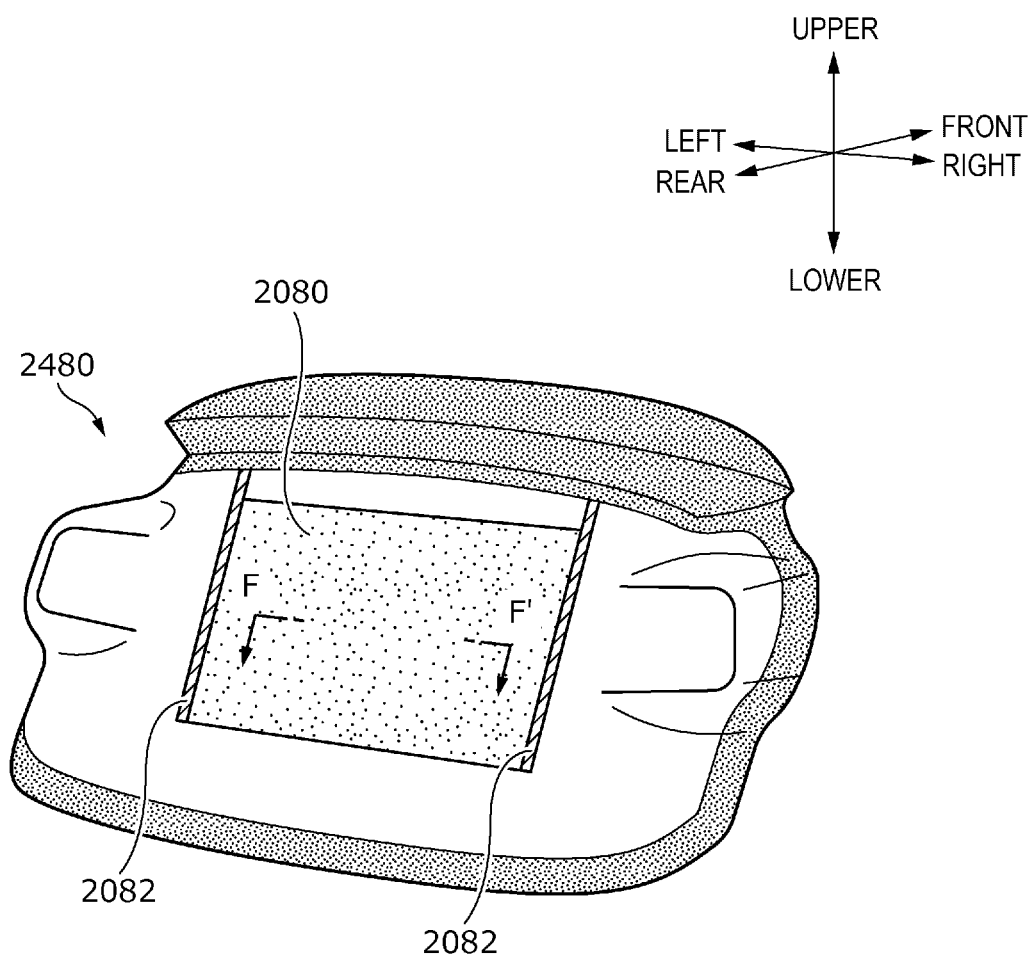
FIG. 18 shows a vehicle rear module provided with a planar heater according to the third embodiment.

FIG. 17 is a front view of a protruding portion attached vehicle rear module 2400 according to the third embodiment. The vehicle rear module according to the third embodiment can be further provided with a planar heater 2080. FIG. 18 shows a vehicle rear module 2480 provided with the planar heater 2080. The planar heater 2080 is formed on a surface of the vehicle rear module 2480 which faces front of the vehicle 1 (see FIG. 19 described later). Electrodes 2082 that supply electric power to the planar heater 2080 are provided on the surface of the vehicle rear module 2480 which faces front of the vehicle 1.

Figure 19:
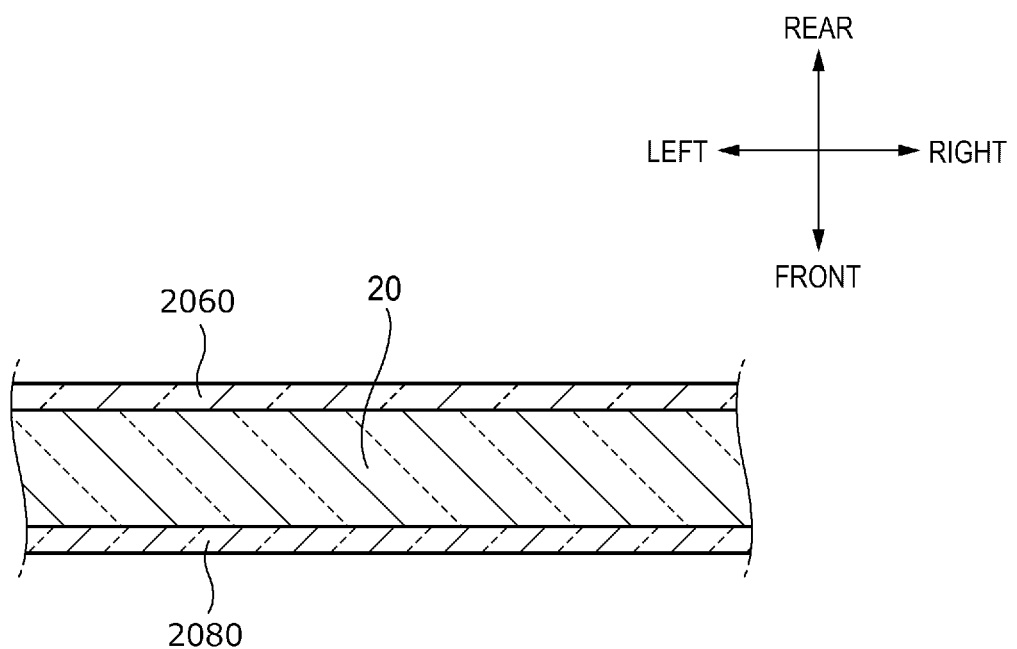
FIG. 19 is a schematic sectional view taken along a line F-F' in FIG. 18.

FIG. 19 is a schematic sectional view taken along the line F-F' in FIG. 18. As shown in FIG. 19, the planar heater 2080 is formed on a vehicle inner side (side facing front of the vehicle 1) of the window portion 24 of the clear member 20. A hard coat layer 2060 is formed on a vehicle outer side (side facing rear of the vehicle 1) of the window portion 24 of the clear member 20.

The planar heater 2080 is a metal layer made of a metal selected from Al, Ag, Cu, Au, Rh, Pt, and Cr. Thickness of the metal layer is 20 nm or more and 150 nm or less. The metal layer (planar heater 2080) having this thickness has transparency. The thickness of the metal layer is preferred to be 30 nm or more and 150 nm or less, more preferred to be 40 nm or more and 150 nm or less, still more preferred to be 40 nm or more and 100 nm or less, and particularly preferred to be 40 nm or more and 80 nm or less.

The planar heater 2080 can be formed by depositing a metal selected from Al, Ag, Cu, Au, Rh, Pt, and Cr on the clear member 20 by vapor deposition. The metal is preferred to be selected from Al, Ag, Cu, Au, and Rh, more preferred to be selected from Al, Ag, Cu, and Au, still more preferred to be selected from Al and Ag, and particularly preferred to be Al. By providing the electrodes 2082 in the left-right direction of the planar heater 2080, electric power can be supplied to the planar heater 2080. The electrodes 2082 may have transparency.

(Effects)

Since a window portion made of glass has good thermal conductivity, dew condensation can be efficiently removed by linear silver paste. On the other hand, since a resin member has poor thermal conductivity compared to glass, it takes time to remove dew condensation with a linear heater.

The vehicle rear module 2480 having the above configuration includes the planar heater 2080 formed of a specific metal layer. Accordingly, the window portion 24 can be uniformly heated as compared with a case in which a linear heater is used. Since the metal layer is made of a metal selected from Al, Ag, Cu, Au, Rh, Pt, and Cr, and the thickness of the metal layer is set to 20 nm or more and 150 nm or less, the window portion can be efficiently heated to remove dew condensation. Since the metal layer has a constant transmittance, an occupant can visually recognize the outside of the vehicle from inside the vehicle.

It is preferred that, when infrared reflectance of the planar heater 2080 is 80% or more, a high thermal barrier effect is obtained.

(Various Modifications)

The planar heater 2080 can also be provided on the vehicle outer side of the clear member 20. In this case, the hard coat layer 2060 may cover the planar heater 2080.

Examples of Third Embodiment

Next, the third embodiment will be described in detail with reference to examples. The examples are merely illustrative and do not limit the present invention.

(Fog Removal Test)

A thin metal film having a size of 400 mm×1300 mm was deposited on one surface of a transparent resin plate by sputtering. Furthermore, a bus bar (electrode) for supplying electric power to two short sides of the thin metal film was formed. The transparent resin plate was cooled to 4° C., and a surface of the thin metal film on which no thin metal film was deposited was fogged by a steam generator. Thereafter, a voltage of 12.8 V was applied and time until the fogging was removed was measured. A was recorded if the time required for defogging was 15 minutes or less, B was recorded if the time was longer than 15 minutes and 30 minutes or less, and C was recorded if the time was longer than 30 minutes. Results of the evaluation by changing a metal species and thickness of the thin metal film are shown in Tables 1 and 2.

(Light Transmission Test)

Light transmittance of a visible light region on a transparent resin plate including the prepared thin metal film was measured. A was recorded if the light transmittance was 30% or more, B was recorded if the light transmittance was less than 30% and 10% or more, and C was recorded if the light transmittance was less than 10%. Results of the evaluation by changing a metal species and thickness of the thin metal film are shown in Tables 1 and 2.

TABLE 1

| Example | Metal Species | Film Thickness [nm] | Fog Removal | Light Transmission |
|---------|---------------|---------------------|-------------|--------------------|
| 1-1 | Al | 10 | C | A |
| 1-2 |    | 20 | C | A |
| 1-3 |    | 40 | B | A |
| 1-4 |    | 60 | A | A |
| 1-5 |    | 80 | A | A |
| 1-6 |    | 100 | A | B |
| 1-7 |    | 150 | A | B |
| 1-8 |    | 200 | A | C |
| 2-1 | Ag | 10 | C | A |
| 2-2 |    | 20 | B | A |
| 2-3 |    | 40 | A | A |
| 2-4 |    | 60 | A | A |
| 2-5 |    | 80 | A | A |
| 2-6 |    | 100 | A | B |
| 2-7 |    | 150 | A | B |
| 3-1 | Cu | 10 | C | A |
| 3-2 |    | 20 | B | A |
| 3-3 |    | 40 | A | A |
| 3-4 |    | 60 | A | A |
| 3-5 |    | 80 | A | A |

TABLE 1-continued

| Example | Metal Species | Film Thickness [nm] | Fog Removal | Light Transmission |
|---|---|---|---|---|
| 3-6 | | 100 | A | B |
| 3-7 | | 150 | A | B |

TABLE 2

| Example | Metal Species | Film Thickness [nm] | Fog Removal | Light Transmission |
|---|---|---|---|---|
| 4-1 | Au | 10 | C | A |
| 4-2 | | 20 | C | A |
| 4-3 | | 40 | B | A |
| 4-4 | | 60 | A | A |
| 4-5 | | 80 | A | A |
| 4-6 | | 100 | A | B |
| 4-7 | | 150 | A | B |
| 5-1 | Rh | 40 | C | A |
| 5-2 | | 60 | B | A |
| 5-3 | | 80 | B | A |
| 5-4 | | 100 | B | B |
| 5-5 | | 150 | A | B |
| 6-1 | Pt | 80 | C | A |
| 6-2 | | 100 | C | B |
| 6-3 | | 150 | B | B |
| 7-1 | Cr | 80 | C | A |
| 7-2 | | 100 | C | B |
| 7-3 | | 150 | B | B |
| 7-4 | | 200 | B | C |

In Example 1-4, Example 1-5, Examples 2-3 to 2-5, Examples 3-3 to 3-5, Example 4-4, and Example 4-5, A was obtained in both the fog removal test and the light transmission test, and it was confirmed that a proper planar heater was formed. In Example 1-3, Example 1-6, Example 1-7, Example 2-2, Example 2-6, Example 2-7, Example 3-2, Example 3-6, Example 3-7, Example 4-3, Example 4-6, Example 4-7, Examples 5-2 to 5-5, Example 6-3, and Example 7-3, no C was obtained in either the fog removal test or the light transmission test, and it was confirmed that a good planar heater was formed. In Example 1-1, Example 1-2, Example 1-8, Example 2-1, Example 3-1, Example 4-1, Example 4-2, Example 5-1, Example 6-1, Example 6-2, Example 7-1, Example 7-2, and Example 7-4, C was obtained in either the fog removal test or the light transmission test, and it was confirmed that no planar heater exhibiting desired performance was formed.

Fourth Embodiment

Hereinafter, a fourth embodiment of the present invention will be described in detail with reference to the drawings. A method of manufacturing a vehicle rear module according to the fourth embodiment is the same as that of the first embodiment, and a description thereof will be omitted. Components in the fourth embodiment that are the same as those in the first embodiment are denoted by the same reference numerals, and a detailed description thereof is omitted.

(Vehicle Back Door and Vehicle Rear Module)

Figure 20:
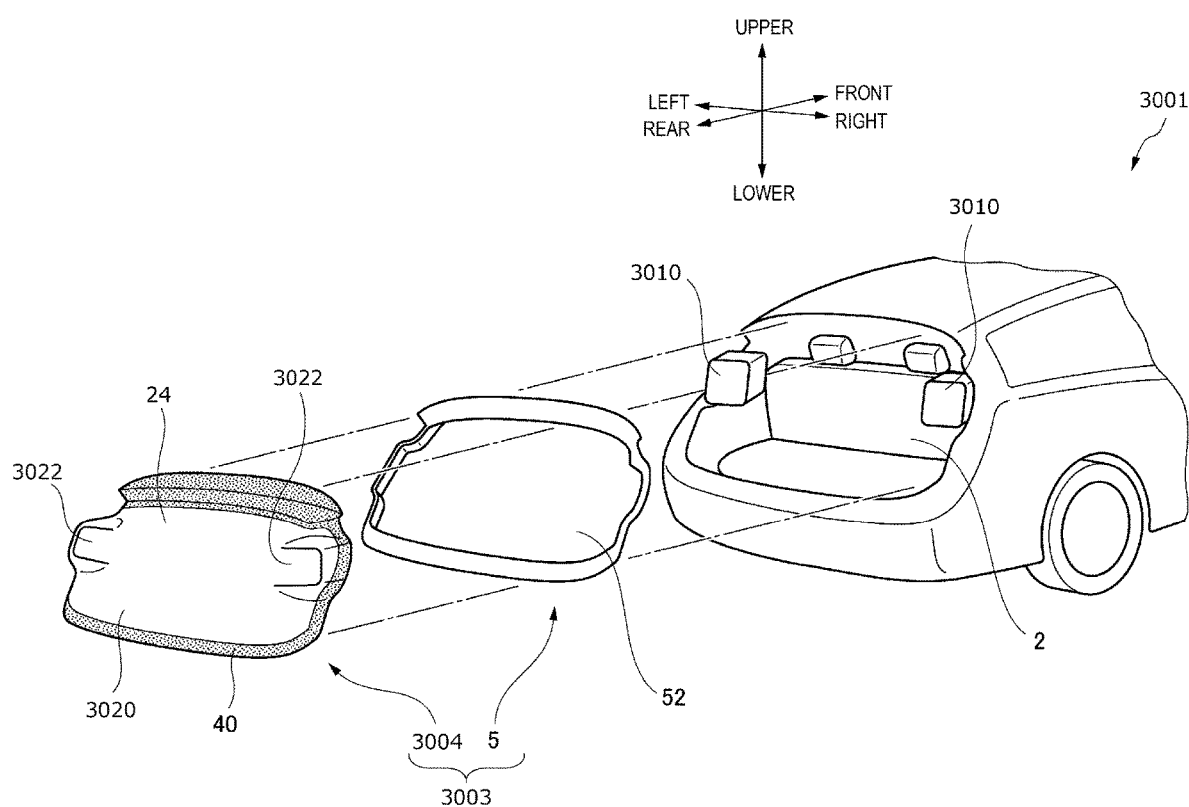
FIG. 20 is a schematic view showing a configuration of a vehicle back door according to a fourth embodiment.

First, a vehicle back door according to the present embodiment will be described with reference to FIG. 20. FIG. 20 is a schematic view showing a configuration of a vehicle back door 3003. The vehicle back door 3003 is attached to a rear portion of a vehicle 3001 so as to open and close the opening 2 provided in the rear portion of the vehicle 3001. The vehicle back door 3003 includes a vehicle rear module 3004 and the back door inner 5 provided inside the vehicle 3001 relative to the vehicle rear module 3004.

The vehicle rear module 3004 has a size capable of covering the opening 2 in the rear portion of the vehicle 3001 (FIG. 20). The vehicle rear module 3004 includes a clear member 3020 and the colored member 40. The clear member 3020 is a colorless or colored transparent member. The clear member 3020 monolithically includes lens portions 3022 that transmit light and a window portion 3024. The colored member 40 is a member having a lower light transmittance than the clear member 3020 does. The colored member 40 is colored to shield at least a part of the inside of the vehicle 3001 from the outside. The clear member 3020 and the colored member 40 are made of a resin such as a polycarbonate (PC).

A pair of left and right rear combination lamps 3010 (examples of a light source portion) are provided at positions in front of the lens portions 3022 of the clear member 3020 of the vehicle rear module 3004 (FIG. 20). The lens portions 3022 in the present embodiment transmit light of a stop lamp and a turn signal lamp of the rear combination lamps 3010. The rear combination lamps 3010 are attached to the vehicle 3001, and are covered by the lens portions 3022 of the clear member 3020 of the vehicle rear module 3004 when the vehicle back door 3003 is closed.

Figure 21:
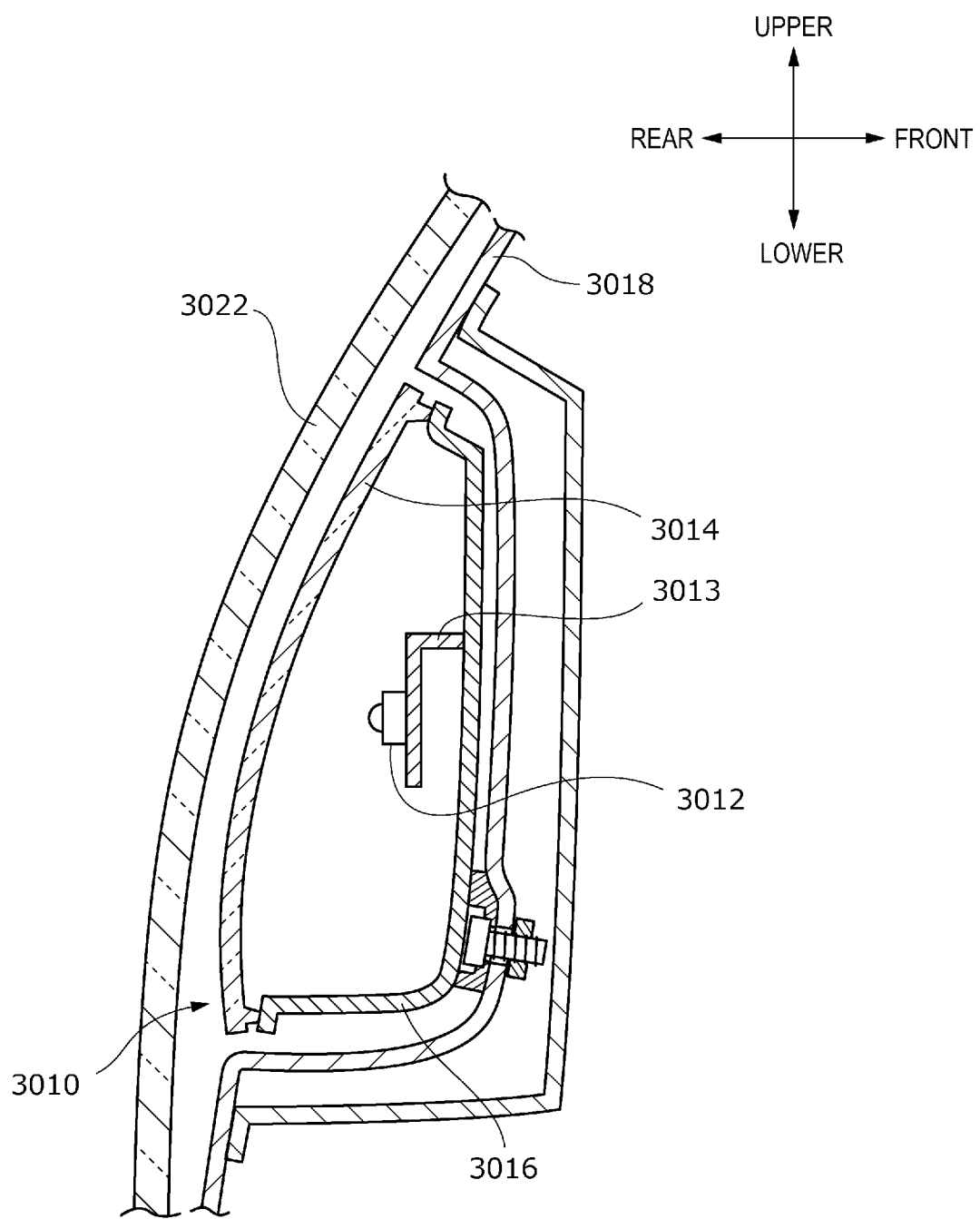
FIG. 21 is a sectional view showing a rear combination lamp and a lens portion when the vehicle back door according to the fourth embodiment is closed.

FIG. 21 is a sectional view showing the rear combination lamp 3010 and the lens portion 3022 when the vehicle back door 3003 is closed. The rear combination lamp 3010 includes a light source 3012, a support portion 3013 that supports the light source 3012, a housing 3016 that houses the light source 3012, and a lens 3014 attached to the housing 3016. The rear combination lamp 3010 is attached to a vehicle body 3018 by the housing 3016. When the vehicle back door 3003 is closed, the lens portion 3022 functions as an outer cover of the rear combination lamp 3010.

The lens portion 3022 may refract light, or may be a simple cover that only transmits light of the rear combination lamp. The rear combination lamp 3010 may include an inner lens and an outer lens instead of including one lens 3014. When the vehicle back door 3003 is opened, the lens 3014 of the rear combination lamp 3010 is exposed.

Configurations other than the clear portion 3020 of the vehicle rear module 3004 according to the fourth embodiment are the same as those of the vehicle rear module 4 according to the first embodiment shown in FIGS. 4 to 6, and accordingly detailed descriptions thereof will be omitted. The clear member 3020 monolithically includes the window portion 24 and the pair of left and right lens portions 3022, and may further include a spoiler portion (FIG. 20). The window portion 24 is gently curved in the left-right direction from a central portion of the clear member 3020 in the left-right direction. The lens portions 3022 are provided in a pair at left and right positions of the clear member 3020, and protrude rearward from a main curved surface of the clear member 3020 (FIG. 20). A portion of each of left and right end portions of the clear member 3020 (substantially central portion in the upper-lower direction) extends in the substantially front-rear direction of the vehicle 3001, and forms a side surface portion of each of the lens portions 3022 (see FIG. 20). In addition, when the clear member 3020 has a small thickness at the lens portion 3022, the lens portion 3022 can sufficiently transmit light of the lamps, which is preferred. A hard coat layer that prevents damage to the clear member 3020 is provided on surfaces of the window portion 24 and the lens portions 3022 of the clear member 3020 which face rear of the vehicle 3001. The hard coat layer is preferred to have higher scratch resistance at the lamp portions than at the window portion.

(Effects)

According to regulations, it is necessary to mount a lamp on a rear portion of a vehicle body so that vehicle information is transmitted to rear of a vehicle even when a back door is opened. When the lamp is mounted on a back door body only, it is necessary to provide a lamp serving as an auxiliary lamp on a portion of an opening of the vehicle body covered by the back door. In this case, lamps are provided on both the back door and the vehicle body, which is not preferred in terms of cost. Further, the weight of the back door also increases due to presence of the lamp provided on the back door or presence of a power supply mechanism to the lamp.

The vehicle module (vehicle rear module 3004) having the above configuration includes the lens portions 3022 that transmit light of a light source portion (rear combination lamps 3010) attached to the vehicle body 3018 (FIG. 21). Accordingly, even when the vehicle rear module 3004 is closed, light of the rear combination lamps 3010 attached to the vehicle body 3018 is transmitted to the outside of the vehicle, and vehicle information can be transmitted to rear of the vehicle 3001. When the vehicle rear module 3004 is open, light of the rear combination lamps 3010 is directly emitted to the outside of the vehicle, and accordingly it is not necessary to provide a separate auxiliary lamp. In addition, it is not necessary to mount a lamp on the vehicle rear module 3004, and no wiring for supplying electric power to the lamp is required, so that the weight of the vehicle rear module 3004 can be reduced.

The vehicle information mentioned here includes not only a driving status of the vehicle, for example, the vehicle is stopped or backing up, but also attributes of an occupant and widely conceivable information for communication with other vehicles and pedestrians.

(Modifications)

Figure 22A:
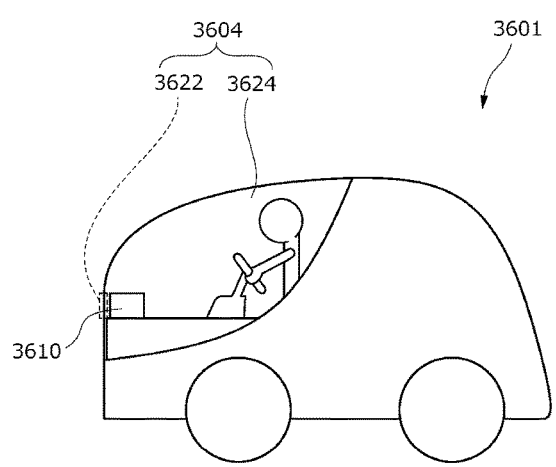
FIGS. 22A and 22B are schematic views showing a vehicle including a vehicle front module according to the fourth embodiment.
Figure 22B:
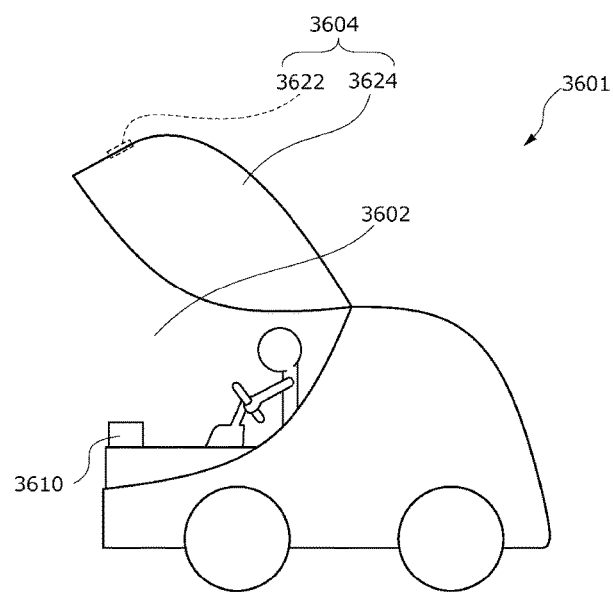

A vehicle front module 3604 is described as a modification of the fourth embodiment. FIGS. 22A and 22B shows a vehicle 3601 including the vehicle front module 3604 at a front portion thereof. The vehicle 3601 includes a front lamp 3610 (example of the light source portion). The vehicle front module 3604 provided at the front portion of the vehicle 3601 is attached so as to be able to open and close an opening 3602 provided in the front portion of the vehicle 3601.

The vehicle front module 3604 is a resin member including a window portion 3624 and a lens portion 3622. The window portion 3624 constitutes a front window of the vehicle 3601. The lens portion 3622 transmits light emitted from the front lamp 3610 when the vehicle front module 3604 is closed (FIGS. 22A and 22B). When the vehicle front module 3604 is opened, the front lamp 3610 is exposed (FIGS. 22A and 22B). Examples of the front lamp 3610 include a high beam lamp, a low beam lamp, a turn signal lamp, and a communication lamp. The front lamp 3610 is not limited to a pair of left and right lamps, and may be a lamp mounted at a central position in the front portion of the vehicle.

In this way, the vehicle module is not limited to being provided in the rear portion of the vehicle, and may be provided in the front portion of the vehicle. When the vehicle module is provided at the front portion, an openable door is provided at the front portion of the vehicle 3601, and a user can get in and out at the front portion of the vehicle 3601. When the vehicle module has a size large enough to cover the front lamp 3610 like the vehicle 3601 shown in FIGS. 22A and 22B, the user can easily get into and out of the vehicle. In addition, the weight of the vehicle front module 3604 can be reduced since it is not necessary to mount a lamp thereon.

(Various Modifications)

Although the fourth embodiment described the vehicle rear module 3004 obtained by two-color molding the clear member 3020 and the colored member 40, the vehicle rear module 3004 can be constituted by the clear member 3020 only.

Although the fourth embodiment described an aspect in which the vehicle rear module 3004 constitutes the vehicle back door 3003 together with the back door inner 5, the vehicle module may be also regarded as a resin member constituting a door of the vehicle. It is also conceivable that the vehicle rear module 3004 is directly attached to the vehicle 3001 without the back door inner 5.

The above embodiment described the rear combination lamps 3010 as examples of the light source portion and the vehicle rear module 3004 including the lens portions 3022 that transmit light. The light source portion is not limited to a combination of a plurality of lamps such as the rear combination lamps 3010, and may be a stop lamp, a turn signal lamp, a back lamp, a tail lamp, a rear fog lamp, a day lamp, a license plate lamp, a high mouth stop lamp, or the like. The light source portion may also be a rear combination lamp that is a combination of these lamps. In addition to the pair of left and right lens portions 22, a portion that transmits light of a lamp may be provided.

The light source portion is not limited to a perfect lamp device, and may include an inner lens, a reflection surface, and a light source, and an outer lens of the lamp may be constituted by the lens portion of the vehicle module. In addition, the reflective surface may be separately provided on the outer lens.

Members such as a cleaner, a wiper, a sensor, and a defogger may be mounted on the vehicle rear module 3004 in the above embodiment. Examples of the sensor include a LiDAR, a camera, and radar. In this case, when a sensor mounting portion for a LiDAR, radar, or the like has a small thickness, the transmittance increases and sensitivity of the sensor increases.

In the above embodiment, polycarbonate (PC) is used as an example of the material of the clear member 3020 and the colored member 40, and a resin material such as an acrylic resin (PMMA), a cycloolefin resin, or a polystyrene resin may also be used.

The above embodiment described the lens portions 3022, 3622 that transmit light of the light source portion of the vehicle module (vehicle rear module 3004 and vehicle front module 3604). When the vehicle module is closed, the lens portions 3022, 3622 of the vehicle module cover the light source portion. For this reason, the lens portions 3022, 3622 of the vehicle module may be regarded as lamp portions that transmit light of the light source portion.

Fifth Embodiment

Hereinafter, a fifth embodiment of the present invention will be described in detail with reference to the drawings.

(Vehicle Back Door and Vehicle Rear Module)

A vehicle back door and a vehicle rear module in the fifth embodiment have the same configurations as the vehicle back door 3 and the vehicle rear module 4 in the first embodiment except for a configuration of a clear portion 4020. Accordingly, the same members are denoted by the same reference numerals and descriptions thereof are omitted.

Figure 23:
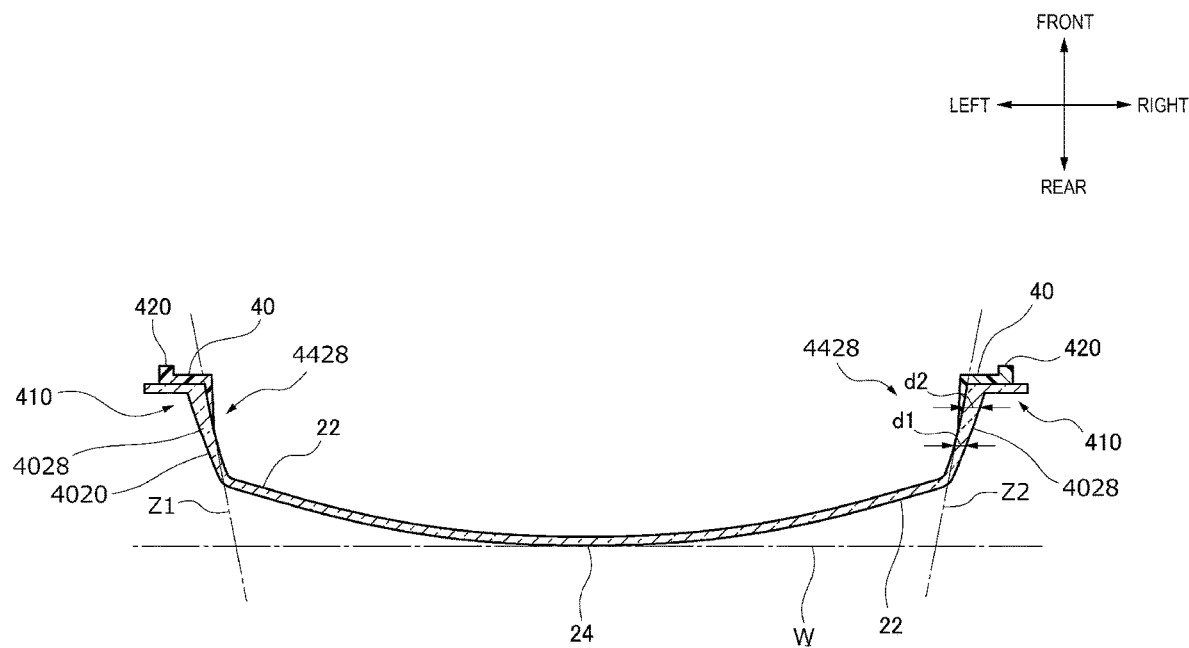
FIG. 23 is a sectional view taken along the line A-A' in FIG. 3 according to a fifth embodiment.

The clear member 4020 monolithically includes the window portion 24 and the lamp portions 22, and may further include the spoiler portion 26. The window portion 24 is gently curved in the left-right direction from a central portion of the clear member 4020 in the left-right direction. In other words, the window portion 24 spreads along a first imaginary plane W which is a tangent plane in contact with a center thereof (FIG. 23). Here, FIG. 23 is a sectional view of a protruding portion attached vehicle rear module 4400 according to the fifth embodiment taken along the line A-A' in FIG. 3. Spreading along the first imaginary plane W includes spreading obliquely relative to the first imaginary plane W.

The lamp portions 22 are provided in a pair at left and right positions of the clear member 4020, and protrude rearward from a main curved surface of the clear member 4020 (FIGS. 1 and 2). A portion of each of left and right end portions 4028 of the clear member 4020 (substantially central portion in the upper-lower direction) extends in the substantially front-rear direction of the vehicle 1, and forms a side surface portion (portion of the end portions 4028) of each of the lamp portions 22 (see FIGS. 1, 2, and 23). In other words, the portion of each of the left and right end portions 4028 of the clear member 4020 extends along a corresponding one of second imaginary planes Z1, Z2 intersecting the first imaginary plane W (FIG. 23). The "intersecting" mentioned herein refers to a case where an acute angle formed between surfaces is not less than 45 degrees. Extending along the second imaginary planes Z1, Z2 includes spreading obliquely relative to the second imaginary planes Z1, Z2.

The thickness of the end portions 4028 increases in a normal direction of the first imaginary plane W as the end portions 4028 extend far away from the window portion 24 (FIG. 23). The normal direction mentioned here does not strictly refer only to a direction perpendicular to the tangent plane of the surface at the point on the first imaginary plane W, but also includes a direction extending at an angle of 45 degrees or more relative to the tangent plane. In FIG. 23, a thickness d2 of a portion of the end portion 4028 away from the window portion 24 is larger than a thickness d1 of a portion of the end portion 4028 close to the window portion 24. Here, the thicknesses d1, d2 represents the thickness of the end portion 4028 in a direction orthogonal to the normal of the first imaginary plane W (the left-right direction in FIG. 23). The thicknesses d1, d2 may be values measured with, for example, a micrometer that interposes the end portion 4028.

A portion (upper portion) of each of the left and right end portions 4028 of the clear member 4020 forms a side surface portion (end portion) of the spoiler portion 26 (see FIGS. 1 to 3). The side surface portion (end portion) of the spoiler portion 26 is curved and extends along a corresponding one of the second imaginary planes Z1, Z2 (not shown).

Each of left and right end portions 4428 of the protruding portion attached vehicle rear module 4400 excluding the protruding portion 410 includes a portion formed only by the clear member 4020 and a portion where the clear member 4020 and the colored member 40 are bonded (FIGS. 3 and 23). In the present embodiment, left and right end portions of the vehicle rear module are also denoted by the same reference numerals as the left and right end portions 4428 of the protruding portion attached vehicle rear module 4400 excluding the protruding portion 410 for convenience of description. A portion of the end portion 4428 extends along a corresponding one of the second imaginary planes Z1, Z2 intersecting the first imaginary plane W (FIG. 23). In FIG. 23, thickness of a portion of the end portion 4428 away from the window portion 24 (portion where the clear member 4020 and the colored member 40 are bonded) is a sum of the thickness d2 and the thickness of the colored member 40, and is larger than the thickness d1 of a portion of the end portion 4428 close to the window portion 24 (portion formed only by the clear member 4020). The thickness of the end portion 4428 represents the thickness in a direction orthogonal to the normal of the first imaginary plane W (left-right direction in FIG. 23). The thickness of the end portion 4428 may be measured with, for example, a micrometer that interposes the end portion 4428.

A hard coat layer that prevents damage to the clear member 4020 is provided on surfaces of the window portion 24 and the lamp portions 22 of the clear member 4020 which face rear of the vehicle 1. When thickness of the hard coat layer increases toward an upper side of the clear member 4020, weather resistance of an upper portion of the window portion 24 and the lamp portions 22 is improved. For example, a difference in thickness between the hard coat layer on the window portion 24 close to the spoiler portion 26 and the hard coat layer on a lower portion of the clear member 4020 is preferred to be 0.5 μm or more and 20 μm or less, and is more preferred to be 0.5 μm or more and 10 μm or less. The hard coat layer is preferred to have higher scratch resistance at the lamp portions than at the window portion.

(Method of Manufacturing Vehicle Rear Module)

A mold 4100 used in a method of manufacturing the protruding portion attached vehicle rear module 4400 according to the fifth embodiment has the same configuration as that in the manufacturing method of the first embodiment except for a configuration of a first cavity 4122 formed between a first core mold 4102 and a cavity mold 4106a and a configuration of a second cavity 4124 formed between a second core mold 4104 and a cavity mold 4106b. Accordingly, the same members are denoted by the same reference numerals and descriptions thereof will be omitted.

Figure 24:
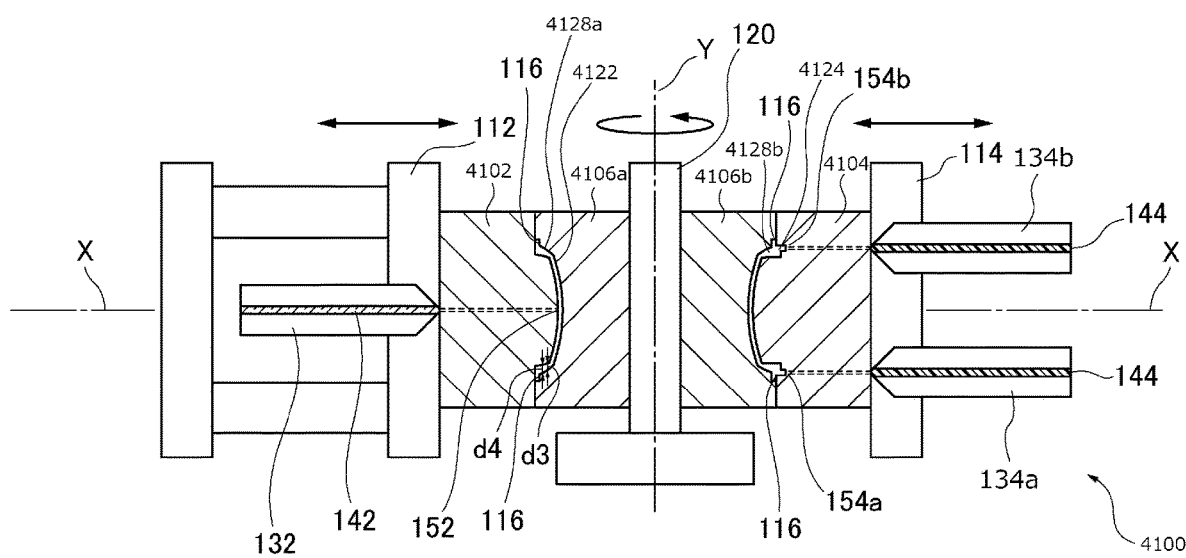
FIG. 24 is a schematic view showing a configuration of a mold according to the fifth embodiment.

Each of the first cavity 4122 and the second cavity 4124 includes an end portion corresponding portion 4128a corresponding to the end portion 4028 of the clear member 4020 and an end portion corresponding portion 4128b corresponding to the end portion 4428 of the protruding portion attached vehicle rear module. Here, FIG. 24 is a schematic view showing a configuration of the mold 4100 used in the fifth embodiment. In FIG. 24, in a Y-axis direction (direction orthogonal to a pressing direction), a dimension (width) d4 of a portion of the end portion corresponding portion 4128a far from the resin injection hole 152 is larger than a dimension (width) d3 of a portion of the end portion corresponding portion 4128a close to the resin injection hole 152. A direction from the portion of the end portion corresponding portion 4128a close to the resin injection hole 152 to the portion far from the resin injection hole 152 is a flow direction of the transparent resin 142.

The protruding portion attached vehicle rear module 4400 can be manufactured by injection compression molding in accordance with the same procedure as the manufacturing method described in the first embodiment. The "compression" mentioned here is not limited to a meaning in a narrow sense, and is used as a term including so-called pressing. A step of injecting the transparent resin 142 to the first cavity 122 in the first embodiment may be replaced with an injection step in the present embodiment. A step of compressing the transparent resin 142 by compressing and spreading the transparent resin 142 in the first cavity 122 in the first embodiment may be replaced with a pressing step in the present embodiment.

Figure 25:
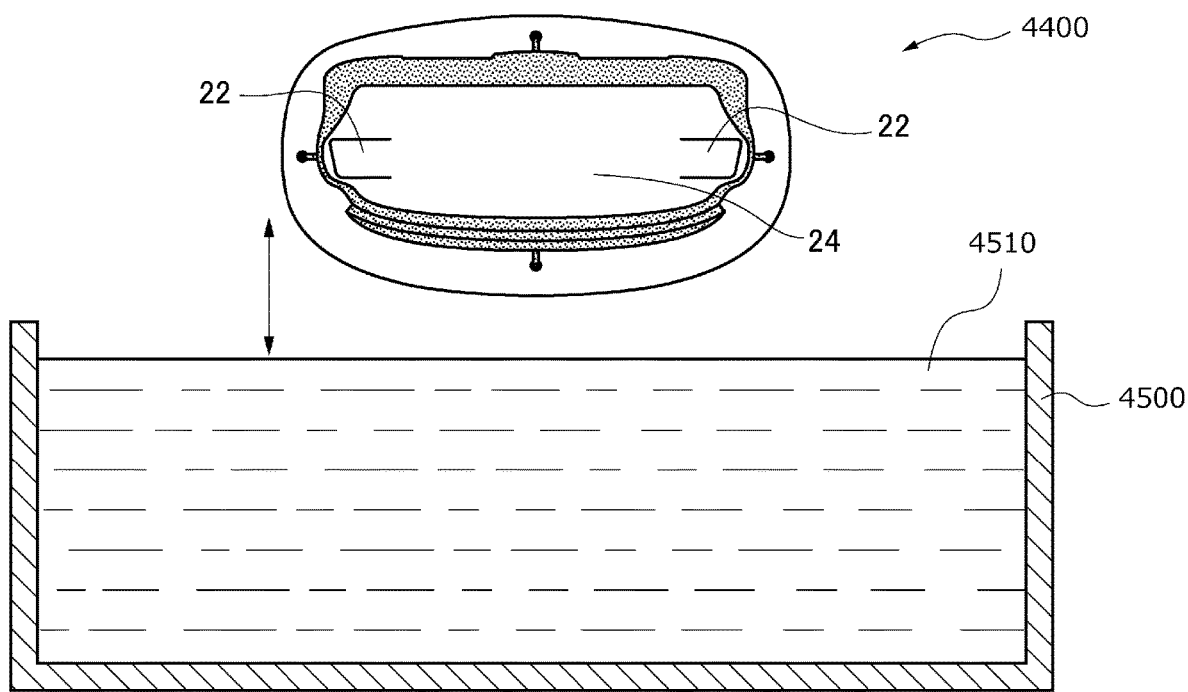
FIG. 25 shows a state in which a hard coat layer is formed on a protruding portion attached vehicle rear module according to the fifth embodiment.

As shown in FIG. 25, in forming of the hard coat layer, the entire protruding portion attached vehicle rear module 4400 is immersed into, for example, a material bath 4500 containing a hard coat material 4510, with its upper portion down. Thereafter, when the vehicle rear module 4400 is pulled up in the same direction, the hard coat material 4510 is preferred to be coated to the upper portion of the window portion 24 and the lamp portions 22 thicker than the lower portion of the protruding portion attached vehicle rear module 4400 is. Alternatively, the entire vehicle rear module 4400 may be immersed with its left or right portion down. Thereafter, when the vehicle rear module 4400 is pulled up in the same direction, the hard coat material 4510 is uniformly coated to the window portion 24 without dripping marks, which is preferred.

(Effects)

According to the vehicle rear module in the fifth embodiment, since each of the end portions 4028 of the clear member 4020 extends along a corresponding one of the second imaginary planes Z1, Z2 intersecting with the first imaginary plane W, it is possible to counteract a force acting in the normal direction of the first imaginary plane W, thereby exhibiting high strength. The thickness of the end portions 4028 increases in the normal direction of the first imaginary plane W as the end portions 4028 extend far away from the window portion 24 (d2>d1). For this reason, when the transparent resin 142 is pressed by the first core mold 4102 at the time of manufacture, it is possible to ensure a large flow path of the transparent resin 142 when the transparent resin 142 spreads to the end portion supporting portion 4128a and the protruding portion forming portion 116. This makes it easier for the transparent resin 142 to flow to these portions, and it is possible to manufacture the vehicle rear module with good yield while preventing a molding failure. The strength of the clear member 4020 can also be further improved.

The vehicle rear module including the colored member 40 and the clear member 4020 has high strength and can ensure the strength of the entire vehicle rear module by the colored member 40.

Each of left and right end portions of the spoiler portion 26 of the vehicle rear module is curved and extends along a corresponding one of the second imaginary plane Z1, Z2. Accordingly, the left and right end portions of the spoiler portion 26 can counteract the force acting in the normal direction of the first imaginary plane W, thereby exhibiting high strength.

Since the left and right end portions of the spoiler portion 26 are curved, there is an advantage that, when a camera or a sensor is mounted on the end portions, not only rear of the vehicle but also the left-right direction of the vehicle can be perceived. In this case, the camera is not limited to a backing up camera used during parking operation, and an effect of collision prevention and the like can be expected since the camera can be installed at a high position. A LiDAR, a radar, or the like can be mounted as the sensor in accordance with light that can be transmitted such as near-infrared light (IR) so that the left-right direction of the vehicle can be perceived.

According to the method of manufacturing the vehicle rear module in the present embodiment, in a direction orthogonal to the pressing direction in the pressing step, the dimension of the end portion corresponding portion 4128a of the mold 4100 that corresponds to the end portion 4028 of the clear member 4020 of the vehicle rear module 4100 increases in the flow direction of the transparent resin 142 (d4>d3). For this reason, when the transparent resin 142 is pressed by the first core mold 4102 at the time of manufacture, it is possible to ensure a large flow path of the transparent resin 142 when the transparent resin 142 spreads to the end portion supporting portion 4128a and the protruding portion forming portion 116. This makes it easier for the transparent resin 142 to flow to these portions, and it is possible to manufacture the vehicle rear module 4004 with good yield while preventing a molding failure. The strength of the clear member 4020 can also be further improved.

(Various Modifications)

The fifth embodiment can also include the modifications described in the first embodiment.

In addition, the lamp portions 22 may constitute an outer cover of a lamp, or may constitute a lens of the lamp. In addition to the lamp portions 22, a portion of the vehicle rear module may constitute the lens and/or the outer cover.

Although the above embodiment described the vehicle rear module obtained by two-color molding the clear member 4020 and the colored member 40, the vehicle rear module can be constituted by the clear member 4020 only.

The present invention is not limited to the above embodiments and may be modified or improved as appropriate. Materials, shapes, dimensions, numerical values, forms, numbers, arrangement places, and the like of components in the above embodiments are optional and not limited as long as the present invention can be achieved.

Meanwhile, some or all of the foregoing embodiments can be described as in the following supplements.

(Supplement 1)

A method of manufacturing a vehicle rear module to be attached to open and close an opening provided in a rear portion of a vehicle, wherein the vehicle rear module includes:
  a clear member monolithically including a lamp portion that transmits light of at least a stop lamp and a turn signal lamp and a window portion; and
  a colored member configured to shield at least a part of inside of the vehicle from outside, and wherein the method of manufacturing the vehicle rear module includes:
  injecting a transparent resin from a single resin injection hole into a first cavity to form the clear member; and
  injecting a coloring resin from a plurality of resin injection holes into a second cavity to form the colored member.

(Supplement 2)

The method of manufacturing the vehicle rear module according to Supplement 1,
  wherein the coloring resin is injected into the second cavity in which the clear member is disposed to form the colored member.

(Supplement 3)

The method of manufacturing the vehicle rear module according to Supplement 1,
  wherein the transparent resin is injected into the first cavity in which the colored member is disposed to form the clear member.

(Supplement 4)

A vehicle back door to be attached to open and close an opening provided in a rear portion of a vehicle, the vehicle back door comprising:
  a vehicle rear module including:
    a clear member monolithically including a lamp portion that transmits light of at least a stop lamp and a turn signal lamp and a window portion; and a colored member configured to shield at least a part of inside of the vehicle from outside; and a back door inner provided inside the vehicle relative to the vehicle rear module, wherein the colored member of the vehicle rear module is provided inside the vehicle relative to the clear member.

(Supplement 5)

The vehicle rear door according to Supplement 4, wherein the clear member and the colored member in the vehicle rear module are formed by two-color molding.

(Supplement 6)

The vehicle back door according to Supplement 4, wherein the colored member includes an assembling protrusion protruding toward the inside of the vehicle, and wherein the colored member is attached to the back door inner via the assembling protrusion.

(Supplement 7)

A vehicle back door to be attached to open and close an opening provided in a rear portion of a vehicle, the vehicle back door comprising:

a vehicle rear module including:
a clear member monolithically including a lamp portion that transmits light of at least a stop lamp and a turn signal lamp and a window portion; and
a colored member configured to shield at least a part of inside of the vehicle from outside; and
a back door inner provided inside the vehicle relative to the vehicle rear module, wherein the colored member is bonded to the clear member so as to border an outer edge of the clear member when the window portion is seen in a plan view.

(Supplement 8)

The vehicle back door according to Supplement 7, wherein the colored member is continuous along the outer edge of the clear member.

(Supplement 9)

The vehicle back door according to Supplement 7, wherein the colored member includes a linear portion extending linearly and having a honeycomb structure.

(Supplement 10)

A vehicle rear module to be attached to open and close an opening provided in a rear portion of a vehicle, the vehicle rear module comprising:

a lamp portion that transmits light of at least a stop lamp and a turn signal lamp; and a window portion, wherein a hard coat layer is provided on at least a surface of the window portion which faces outside of the vehicle, and wherein the hard coat layer is made of an acrylic resin or an acrylic urethane resin, a coloring material, and silica nanoparticles.

(Supplement 11)

The vehicle rear module according to Supplement 10, further comprising:

a clear element monolithically including the lamp portion and the window portion; and a colored element configured to shield at least a part of inside of the vehicle from outside when viewed from rear of the vehicle, wherein the hard coat layer is provided on a surface of the colored element which faces the outside of the vehicle.

(Supplement 12)

The vehicle rear module according to Supplement 11, wherein the hard coat layer is provided over a surface of the clear element which faces the outside the vehicle and the surface of the colored element which faces the outside of the vehicle.

(Supplement 13)

The vehicle rear module according to Supplement 12, wherein the hard coat layer is provided over the entire surface of the clear element which faces the outside of the vehicle and the entire surface of the colored element which faces the outside of the vehicle.

(Supplement 14)

A resin vehicle rear module including a window portion, wherein the window portion is provided with a planar heater formed by a metal layer and an electrode configured to supply electric power to the planar heater, and wherein the metal layer is made of a metal selected from Al, Ag, Cu, Au, Rh, Pt, and Cr, and has a thickness of 20 nm or more and 150 nm or less.

(Supplement 15)

The vehicle rear module according to Supplement 14, wherein a hard coat layer is formed on a surface of the window portion which faces outside of a vehicle, and wherein the planar heater is formed on a vehicle inner side of the window portion.

(Supplement 16)

A resin vehicle module to be attached to open and close an opening of a vehicle, the vehicle module comprising:

a window portion; and a lens portion capable of transmitting light emitted from a light source portion attached to the vehicle in a state the opening is closed.

(Supplement 17)

The vehicle module according to Supplement 16, wherein the lens portion includes a pair of left and right lens portions so as to transmit light emitted from a pair of right and left light source portions attached to the vehicle.

(Supplement 18)

A vehicle rear module to be attached to open and close an opening provided in a rear portion of a vehicle, the vehicle rear module monolithically comprising:

a window portion spreading along a first imaginary plane; and a pair of left and right lamp portions configured to transmit light from lamp units, wherein at least a portion of each of left and right end portions of the vehicle rear module extends along a second imaginary plane intersecting the first imaginary plane.

(Supplement 19)

The vehicle rear module according to Supplement 18, wherein a thickness of each of the end portions increases in a normal direction of the first imaginary plane as the end portion extends far away from the window portion.

The present application is based on Japanese Patent Applications (No. 2018-053289, No. 2018-053290, No. 2018-053291, No. 2018-053292, No. 2018-053293, No. 2018-053294, and No. 2018-053295) filed Mar. 20, 2018, entire contents of which are incorporated herein by reference. In addition, all references cited here are incorporated by reference in their entirety.

REFERENCE SIGNS LIST

1, 3001, 3601 vehicle
2, 3602 opening
3, 3003 vehicle back door 4, 3004 vehicle rear module
5 back door inner
3010 rear combination lamp
3012 light source
3013 support portion
3014 lens
3016 housing
3018 vehicle body
20, 4020 clear member
22 lamp portion
3022, 3622 lens portion
24, 3624 window portion
26 spoiler portion
40 colored member
42 assembling protrusion
44 linear portion
46 honeycomb structure
52 opening
1060, 2060 hard coat layer
2080 planar heater
2082 electrode
100, 4010 mold
102, 4102 first core mold
104, 4104 second core mold
106a, 106b, 4106a, 4106b cavity mold
112 movable platen
114 fixed platen
116 protruding portion forming portion
120 rotation member
122, 4122 first cavity
124, 4124 second cavity
132 first heating cylinder
134a, 134b second heating cylinder
142 transparent resin
144 coloring resin
152, 154a, 154b resin injection hole
1220 clear element
1240 colored element
400, 1400, 4400 protruding portion attached vehicle rear module
410 protruding portion
420 injection gate mark
2480 vehicle rear module provided with planar heater
3604 vehicle front module
3610 front lamp

The invention claimed is:

1. A method of manufacturing a vehicle rear module to be attached to open and close an opening provided in a rear portion of a vehicle,
wherein the vehicle rear module includes:
a clear member monolithically including a lamp portion that transmits light of at least a stop lamp and a turn signal lamp and a window portion; and
a colored member configured to shield at least a part of inside of the vehicle from outside, and
wherein the method of manufacturing the vehicle rear module includes:
injecting a transparent resin from a single resin injection hole into a first cavity to form the clear member; and
injecting a coloring resin from a plurality of resin injection holes into a second cavity to form the colored member.

2. The method of manufacturing the vehicle rear module according to claim 1,
wherein the coloring resin is injected into the second cavity in which the clear member is disposed to form the colored member.

3. The method of manufacturing the vehicle rear module according to claim 1,
wherein the transparent resin is injected into the first cavity in which the colored member is disposed to form the clear member.

4. A vehicle rear module to be attached to open and close an opening provided in a rear portion of a vehicle, the vehicle rear module comprising:
a lamp portion that transmits light of at least a stop lamp and a turn signal lamp;
a window portion,
a clear element monolithically including the lamp portion and the window portion; and
a colored element configured to shield at least a part of inside of the vehicle from outside when viewed from rear of the vehicle,
wherein a hard coat layer is provided on at least a surface of the window portion which faces outside of the vehicle,
wherein the hard coat layer is made of an acrylic resin or an acrylic urethane resin, a coloring material, and silica nanoparticles, and
wherein the hard coat layer is provided on a surface of the colored element which faces the outside of the vehicle.

5. The vehicle rear module according to claim 4,
wherein the hard coat layer is provided over a surface of the clear element which faces the outside the vehicle and the surface of the colored element which faces the outside of the vehicle.

6. The vehicle rear module according to claim 5,
wherein the hard coat layer is provided over the entire surface of the clear element which faces the outside of the vehicle and the entire surface of the colored element which faces the outside of the vehicle.

7. A vehicle rear module to be attached to open and close an opening provided in a rear portion of a vehicle, the vehicle rear module monolithically comprising:
a window portion spreading along a first imaginary plane; and
a pair of left and right lamp portions configured to transmit light from lamp units,
wherein at least a portion of each of left and right end portions of the vehicle rear module extends along a second imaginary plane intersecting the first imaginary plane,
wherein a thickness of each of the end portions measured in a direction parallel to the first imaginary plane increases in a normal direction of the first imaginary plane as the end portion extends away from the window portion.

* * * * *